(12) United States Patent
Rocha

(10) Patent No.: US 11,058,186 B2
(45) Date of Patent: Jul. 13, 2021

(54) DIMENSIONALLY FLEXIBLE TOUCH FASTENER STRIP

(71) Applicant: Gerald Rocha, Derry, NH (US)

(72) Inventor: Gerald Rocha, Bedford, NH (US)

(73) Assignee: Gerald Rocha, Derry, NH (US)

( * ) Notice: Subject to any disclaimer, the term of this patent is extended or adjusted under 35 U.S.C. 154(b) by 0 days.

(21) Appl. No.: 16/523,858

(22) Filed: Jul. 26, 2019

(65) Prior Publication Data

US 2019/0387846 A1    Dec. 26, 2019

Related U.S. Application Data

(63) Continuation of application No. 15/729,588, filed on Oct. 10, 2017, now Pat. No. 10,405,614, which is a
(Continued)

(51) Int. Cl.
*A44B 18/00* (2006.01)
*B60N 2/58* (2006.01)
(Continued)

(52) U.S. Cl.
CPC ...... *A44B 18/0003* (2013.01); *A44B 18/0073* (2013.01); *B29C 37/0085* (2013.01);
(Continued)

(58) Field of Classification Search
CPC ............ A44B 18/0073; A44B 18/0069; A44B 18/0003; Y10T 24/27; Y10T 24/2792; Y10T 428/24017
See application file for complete search history.

(56) References Cited

U.S. PATENT DOCUMENTS 3,128,514 A   4/1964  Parker et al.
3,182,589 A   5/1965  Green et al.
(Continued)

FOREIGN PATENT DOCUMENTS

CN    1176616 A    3/1998
CN    1925767 A    3/2007
(Continued)

OTHER PUBLICATIONS

Extended European Search Report for European Application No. 11807603.3, dated Jan. 19, 2015.
(Continued)

*Primary Examiner* — Robert Sandy
*Assistant Examiner* — Michael S Lee
(74) *Attorney, Agent, or Firm* — Wolf, Greenfield & Sacks, P.C.

(57) ABSTRACT

A fastening strip for touch fasteners is provided which includes a corrugated portion as well as fastening elements. The corrugated portion allows the strip to be bent in a plane perpendicular as well as parallel with the longitudinal axis of the strip such that it may be applied to curved surfaces and remain substantially flat. Fastening elements such as hooks, loops, mushroom-shaped, bulbous and double hooks may be included on both sides of the strip and on the walls of the channels that form the corrugations as well as between the corrugations. The corrugated fastening strips may be useful for automotive seating and diaper applications. Processes for forming the corrugated fastening strip area also disclosed.

17 Claims, 20 Drawing Sheets

Related U.S. Application Data continuation of application No. 14/284,665, filed on May 22, 2014, now Pat. No. 9,795,194, which is a continuation of application No. 13/185,035, filed on Jul. 18, 2011, now Pat. No. 8,745,827.

(60) Provisional application No. 61/367,197, filed on Jul. 23, 2010, provisional application No. 61/365,724, filed on Jul. 19, 2010, provisional application No. 61/364,996, filed on Jul. 16, 2010.

(51) Int. Cl.
*B29C 59/02* (2006.01)
*B29C 37/00* (2006.01)
B29C 59/04 (2006.01)

(52) U.S. Cl.
CPC .......... *B29C 59/025* (2013.01); *B60N 2/5833* (2013.01); *B29C 59/04* (2013.01); *Y10T 24/27* (2015.01); *Y10T 24/2767* (2015.01); *Y10T 24/2792* (2015.01); *Y10T 29/49826* (2015.01); *Y10T 428/24017* (2015.01)

(56) References Cited

U.S. PATENT DOCUMENTS

| | | |
|---|---|---|
| 3,192,589 A | 7/1965 | Pearson |
| 3,196,490 A | 7/1965 | Erb |
| 3,204,646 A | 9/1965 | Chamberlin |
| 3,270,408 A | 9/1966 | Nealis |
| 3,312,583 A | 4/1967 | Rochlis |
| 3,497,925 A | 3/1970 | Brumlik |
| 3,541,216 A | 11/1970 | Rochlis |
| 3,665,504 A | 5/1972 | Silverman |
| 3,717,908 A | 2/1973 | Perina |
| 3,735,468 A | 5/1973 | Erb |
| 3,752,619 A | 8/1973 | Menzin et al. |
| 3,758,657 A | 9/1973 | Menzin et al. |
| 3,762,000 A | 10/1973 | Menzin et al. |
| 3,837,973 A | 9/1974 | Hiroshia Asakura et al. |
| 3,927,443 A | 12/1975 | Brumlik |
| 4,149,540 A | 4/1979 | Hasslinger |
| 4,194,937 A | 3/1980 | Hashmall |
| 4,326,903 A | 4/1982 | Summo |
| 4,411,721 A | 10/1983 | Wishart |
| 4,548,116 A | 10/1985 | Yoshida et al. |
| 4,615,084 A | 10/1986 | Erb |
| 4,775,310 A | 10/1988 | Fischer |
| 4,794,028 A | 12/1988 | Fischer |
| 4,811,428 A | 3/1989 | Waldman et al. |
| 4,881,997 A | 11/1989 | Hatch |
| 4,980,003 A | 12/1990 | Erb et al. |
| 4,999,067 A | 3/1991 | Erb et al. |
| 5,067,210 A | 11/1991 | Kayaki |
| 5,107,626 A | 4/1992 | Mucci |
| 5,110,649 A | 5/1992 | Morse et al. |
| 5,231,738 A | 8/1993 | Higashinaka |
| 5,312,456 A | 5/1994 | Reed et al. |
| 5,340,301 A | 8/1994 | Saffire et al. |
| 5,393,475 A | 2/1995 | Murasaki et al. |
| 5,422,156 A | 6/1995 | Billarant |
| 5,500,268 A | 3/1996 | Billarant |
| 5,586,371 A | 12/1996 | Thomas |
| 5,607,635 A | 3/1997 | Melbye et al. |
| 5,614,057 A | 3/1997 | Conley, Jr. et al. |
| 5,624,427 A | 4/1997 | Bergman et al. |
| 5,647,552 A | 7/1997 | Takatori |
| 5,657,516 A | 8/1997 | Berg et al. |
| 5,669,120 A | 9/1997 | Wessels et al. |
| 5,685,050 A | 11/1997 | Murasaki |
| 5,725,704 A | 3/1998 | Gallagher et al. |
| 5,755,015 A | 5/1998 | Akeno et al. |
| 5,781,969 A | 7/1998 | Akeno et al. |
| 5,792,408 A | 8/1998 | Akeno et al. |
| 5,824,955 A | 10/1998 | Saiso et al. |
| 5,860,194 A | 1/1999 | Takizawa et al. |
| 5,879,494 A | 3/1999 | Hoff et al. |
| 5,919,492 A | 7/1999 | Tarr et al. |
| 5,919,493 A | 7/1999 | Sheppard et al. |
| 5,945,193 A * | 8/1999 | Pollard et al. ..... A44B 18/0076 428/100 |
| 5,953,797 A | 9/1999 | Provost et al. |
| 5,974,635 A | 11/1999 | Murasaki |
| 5,979,024 A | 11/1999 | Renwick |
| 5,981,027 A | 11/1999 | Parellada |
| 6,054,091 A | 4/2000 | Miller et al. |
| 6,061,881 A | 5/2000 | Takizawa et al. |
| 6,146,738 A | 11/2000 | Tsuji et al. |
| 6,165,298 A | 12/2000 | Samida et al. |
| 6,481,063 B2 | 11/2002 | Shepard et al. |
| 6,543,099 B1 | 4/2003 | Filion et al. |
| 6,544,245 B2 | 4/2003 | Neeb et al. |
| 6,588,073 B1 | 7/2003 | Zoromski et al. |
| 6,604,264 B1 | 8/2003 | Naohara et al. |
| 6,627,133 B1 | 9/2003 | Tuma |
| 6,645,330 B2 | 11/2003 | Pargass et al. |
| 6,678,924 B2 | 1/2004 | Murasaki et al. |
| 6,694,576 B1 | 2/2004 | Fujisawa et al. |
| 6,708,378 B2 | 3/2004 | Parellada et al. |
| 6,996,880 B2 | 2/2006 | Kurtz, Jr. et al. |
| 7,032,278 B2 | 4/2006 | Kurtz, Jr. |
| 7,044,834 B2 | 5/2006 | Chesley et al. |
| 7,172,008 B2 | 2/2007 | Vanbenschoten et al. |
| 7,241,483 B2 | 7/2007 | Ausen et al. |
| 7,308,738 B2 | 12/2007 | Barvosa-Carter et al. |
| 7,335,205 B2 | 2/2008 | Aeschlimann et al. |
| 7,350,276 B2 | 4/2008 | Minato et al. |
| 7,374,626 B2 | 5/2008 | Van Der Leden |
| 7,451,532 B2 | 11/2008 | Provost et al. |
| 7,461,437 B2 | 12/2008 | Gallant et al. |
| 7,479,195 B2 | 1/2009 | Leidig et al. |
| 7,520,033 B2 | 4/2009 | Clarner |
| 7,622,180 B2 | 11/2009 | Seth et al. |
| 7,678,316 B2 | 3/2010 | Ausen et al. |
| 7,927,681 B2 | 4/2011 | Cheng |
| 8,082,637 B2 | 12/2011 | Tolan et al. |
| 8,322,002 B2 | 12/2012 | Cheng |
| 8,399,086 B2 | 3/2013 | Itoh et al. |
| 8,683,664 B2 | 4/2014 | Tuma et al. |
| 8,683,840 B2 | 4/2014 | Tuma et al. |
| 8,701,252 B2 | 4/2014 | Caveney et al. |
| 8,745,827 B2 | 6/2014 | Rocha |
| 8,756,770 B2 | 6/2014 | Cina et al. |
| 8,784,722 B2 | 7/2014 | Rocha |
| 8,898,867 B2 | 12/2014 | Braun et al. |
| 9,795,194 B2 | 10/2017 | Rocha |
| 10,405,614 B2 | 9/2019 | Rocha |
| 2003/0014033 A1 | 1/2003 | Back |
| 2003/0034583 A1 | 2/2003 | Provost |
| 2003/0085492 A1 | 5/2003 | Schulte |
| 2004/0031130 A1 | 2/2004 | Clarner et al. |
| 2004/0074071 A1 | 4/2004 | Golden et al. |
| 2004/0172792 A1 | 9/2004 | Kurtz |
| 2004/0187276 A1 | 9/2004 | Seth et al. |
| 2005/0079321 A1 | 4/2005 | Tuman et al. |
| 2005/0132543 A1 | 6/2005 | Lindsay et al. |
| 2005/0161851 A1 | 7/2005 | Tachauer et al. |
| 2005/0177986 A1 | 8/2005 | Clarner et al. |
| 2005/0186385 A1 | 8/2005 | Janzen et al. |
| 2005/0209076 A1 | 9/2005 | Boutron et al. |
| 2005/0280175 A1 | 12/2005 | Tachauer et al. |
| 2006/0101626 A1 | 5/2006 | Gallant et al. |
| 2008/0120815 A1 | 5/2008 | Line |
| 2009/0018590 A1 | 1/2009 | Dorawa et al. |
| 2009/0217492 A1 | 9/2009 | Gallant et al. |
| 2010/0038511 A1 | 2/2010 | Golle et al. |
| 2010/0135600 A1 | 6/2010 | Ducauchuis et al. |
| 2010/0180407 A1 | 7/2010 | Rocha |
| 2010/0257704 A1 | 10/2010 | Tuma et al. |
| 2011/0167598 A1 | 7/2011 | Cheng |
| 2011/0258819 A1 | 10/2011 | Cheng |
| 2012/0011685 A1 | 1/2012 | Rocha |
| 2012/0204383 A1 | 8/2012 | Wood et al. |

(56) References Cited

U.S. PATENT DOCUMENTS

| | | |
|---|---|---|
| 2012/0321837 A1 | 12/2012 | Adam |
| 2013/0196110 A1 | 8/2013 | Cheng |
| 2014/0070579 A1 | 3/2014 | Lee |
| 2014/0138993 A1 | 5/2014 | Cheng |
| 2014/0325820 A1 | 11/2014 | Rocha |
| 2014/0338159 A1 | 11/2014 | Sakaguchi et al. |
| 2018/0084870 A1 | 3/2018 | Rocha |

FOREIGN PATENT DOCUMENTS

| | | | |
|---|---|---|---|
| CN | 101053458 | A | 10/2007 |
| JP | H03-146003 | A | 6/1991 |
| JP | H03-247306 | A | 11/1991 |
| JP | H06-501187 | A | 2/1994 |
| JP | H09-19309 | A | 1/1997 |
| JP | H10-146206 | A | 6/1998 |
| JP | H10-512472 | A | 12/1998 |
| JP | H11-127915 | A | 5/1999 |
| JP | H11-509106 | A | 8/1999 |
| JP | 2003-526427 | A | 9/2003 |
| JP | 2004-236957 | A | 8/2004 |
| JP | 2004-535224 | A | 11/2004 |
| JP | 2005-529722 | A | 10/2005 |
| JP | 3114339 | U | 10/2005 |
| JP | 2008-501475 | A | 1/2008 |
| JP | 2009-155741 | A | 7/2009 |
| JP | 2003-339413 | A | 12/2015 |
| TW | 497961 | B | 8/2002 |
| TW | 527172 | B | 4/2003 |
| TW | 528705 | B | 4/2003 |
| TW | 2004-05798 | A | 4/2004 |
| TW | 2010-21737 | A | 6/2010 |
| WO | WO 92/19119 | A1 | 11/1992 |
| WO | WO 02/091872 | A1 | 11/2002 |
| WO | WO 02/094538 | A1 | 11/2002 |
| WO | WO 2009/131044 | A1 | 10/2009 |
| WO | WO 2012/014667 | A1 | 2/2012 |

OTHER PUBLICATIONS

International Preliminary Report on Patentability for International Application No. PCT/US2010/021512, dated Aug. 4, 2011.
International Preliminary Report on Patentability for International Application No. PCT/US2011/044266, dated Jan. 31, 2013.
International Search Report and Written Opinion for International Application No. PCT/US2010/021512, dated May 18, 2010.
International Search Report and Written Opinion for International Application No. PCT/US2011/044266, dated Dec. 13, 2011.
Joshi, Welding of Plastics. Metal Web News. Last accessed online via www.metalwebnews.com/howto/plastics/welding-plastics.pdf. Pdf created Jun. 9, 2002. 5 pages.

* cited by examiner

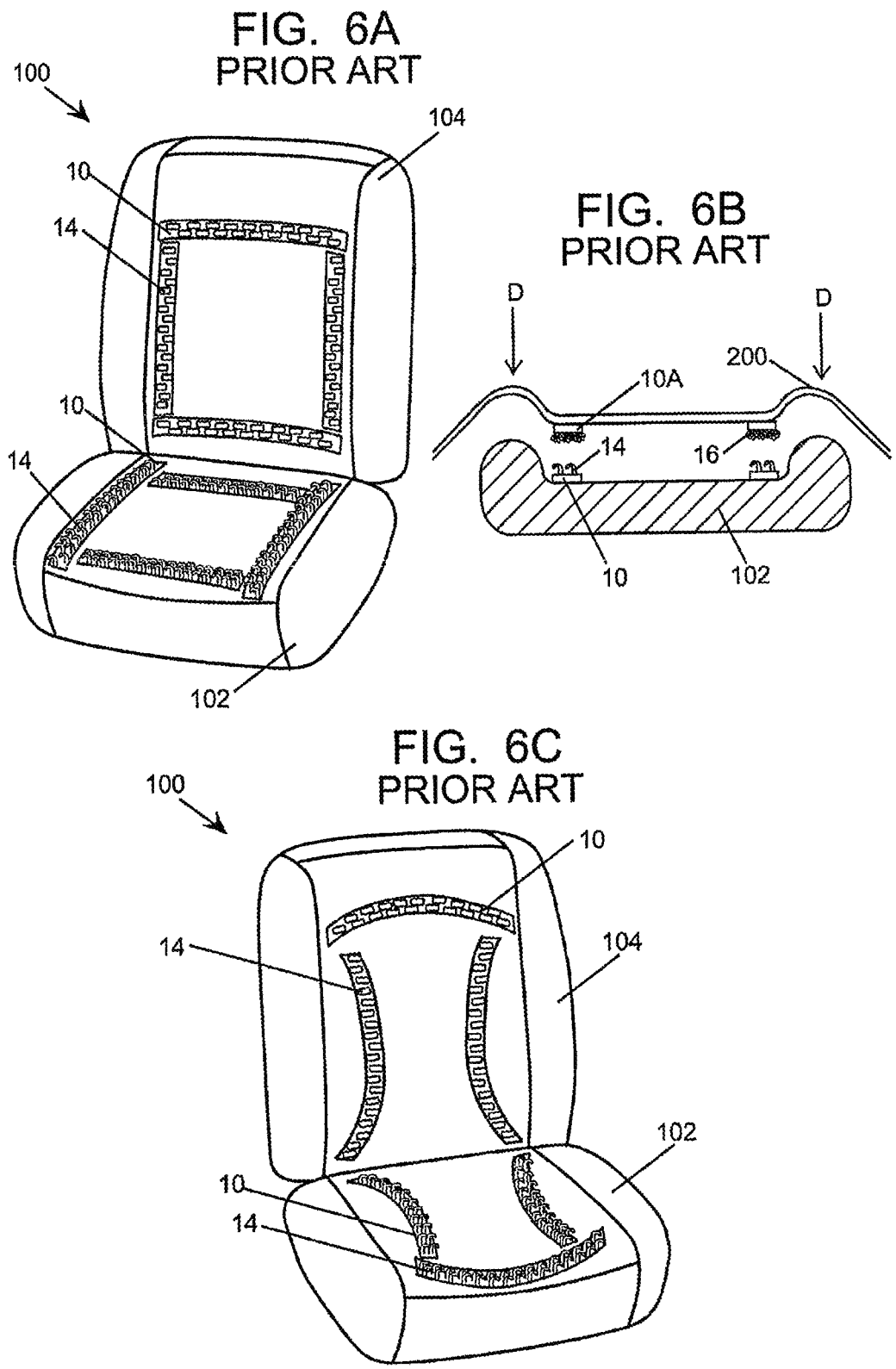

DIMENSIONALLY FLEXIBLE TOUCH FASTENER STRIP

CROSS-REFERENCE TO RELATED APPLICATIONS

This application is a continuation of U.S. patent application Ser. No. 15/729,588, filed Oct. 10, 2017, which is a continuation of U.S. patent application Ser. No. 14/284,665 filed May 22, 2014, which is a continuation of U.S. patent application Ser. No. 13/185,035 filed Jul. 18, 2011 which claims the benefit of U.S. Provisional Application No. 61/364,996 filed Jul. 16, 2010, U.S. Provisional Application No. 61/365,724 filed Jul. 19, 2010, and U.S. Provisional Application No. 61/367,197 filed Jul. 23, 2010 the disclosures of each of which are incorporated herein in their entirety.

FIELD

The present disclosure relates to the field of touch fasteners, particularly "hook and loop" fasteners and, more specifically, to a dimensionally flexible touch fastener strip that may easily be bent in more than a single plane in order to expand the use beyond substantially flat surfaces, and a process for making such.

BACKGROUND

Touch fasteners (i.e. Velcro®, Scotchmate®, Tri-Hook®, etc.) were originally produced using textile technology. Two of the most common types of touch fasteners as of this writing are hook and loop fasteners and mushroom and loop fasteners.

Hook and loop type fasteners, as they were originally developed and commercialized, consisted of a pair of textile strips. These textile strips could be mated to form a recyclable closure; one of the mates being a strip of textile fabric having numerous monofilament fastening elements, shaped like hooks, projecting from one surface and the other mate being a textile strip with multi-filamented fastening elements, woven into loop shaped projections on one surface. When the mating surfaces of these strips are pressed together, the numerous hook-shaped elements on one strip were ensnared by the loop elements on the opposing strip, creating a temporary, recyclable bond. As the strips were peeled apart, the hook elements were deformed resulting in separation from the loop elements, allowing the fasteners to be reused many times.

In the case of mushroom and loop fasteners, the hook type mating strip was replaced with a strip containing numerous monofilament projections having mushroom shaped heads.

The mushroom shaped heads were formed by heating the tips of straight monofilament projections until a bulbous "mushroom head" was formed on each projection. As the strips were peeled apart, the mushroom shaped elements generally deflected and released the loop element, however, the mushroom head would often snap and destroy the loop element, thus reducing the number of times the fastener may be reused.

More recently the use of thermoplastic extrusion/molding methods for making touch fasteners has become popular. In the case of hook and loop fasteners, the hook strip may now be extruded/molded while the loop strip may be still produced using woven, knitted or non-woven fabric technologies. In the case of mushroom and loop fasteners, the mushroom strip may be produced by extruding/molding a strip of material having pin-like projections and then post-forming bulbous mushroom-like heads on the pin-like projections; the loop strip still being produced using woven, knitted or non-woven technologies.

In some instances, two mating surfaces of mushroom-like heads or bulbs may be engaged to form a fastener.

The use of extrusion/molding technologies for the production of hook type and mushroom type touch fasteners has significantly reduced the manufacturing cost and improved the performance and aesthetics of touch fasteners, thus allowing their use in large volume applications, such as tab closures on disposable diapers or for the attachment of upholstery fabrics in automotive type seating.

Both textile and molded touch fasteners are typically produced with a flat or planar base (strip) and numerous projections or loops (fastening elements) emanating from the top and/or bottom surface of the strip. These fastener strips may typically be sold in strip-like or ribbon-like form as depicted in FIG. 1A and FIG. 1B.

In FIG. 1A, the fastener strip 10 is shown as generally planar and comprises a flat base 12 with a plurality of hook-like 14 or mushroom-shaped (not shown) projections emanating from one surface.

FIG. 1B illustrates the mating strip 10A which is generally planar and comprises a flat base 12A with a plurality of loops 16 emanating from one surface. Inverting strip 10 and engaging the surface with the projections with the loop surface of strip 10A forms a touch fastener.

Various cross sections of typical fastener strips are depicted in FIG. 1C through FIG. 1H below.

FIG. 1C illustrates one surface of the base 12 with hook-shaped fasteners 14 projecting therefrom.

FIG. 1D illustrates one surface of the base 12A with loops 16 emanating therefrom.

FIG. 1E illustrates hook-shaped fasteners 14 projecting from both surfaces of the base 12.

FIG. 1F illustrates loops 16 emanating from both surfaces of the base 12A.

FIG. 1G illustrates one surface of the base 12 (or 12A) with hook-shaped fasteners 14 projecting therefrom and loops 16 emanating from the opposite surface.

FIG. 1H illustrates one surface of the base 12 with mushroom-shaped fasteners 18 projecting therefrom.

FIG. 1I illustrates one surface of the base 12 with bulb-shaped fasteners 19 projecting therefrom.

While the planar form of the strip that is typical in prior art fastening strips allows the fastening strip to be flexible or compliant when bent in a direction generally perpendicular to the surface of the base as depicted in FIG. 2A, it does not typically allow for compliance or flexing in a generally coplanar direction (or parallel with the plane of the base) as depicted in FIG. 2B.

FIG. 2A illustrates the strip 10 being capable of bending in a plane generally perpendicular (arrow A) to either surface of the strip 10.

FIG. 2B illustrates that the strip 10 is essentially incapable of bending in a plane parallel (arrow B) to the surface of the strip 10.

The ability of the fastener strip 10 or 10A to be bent in a geometry generally coplanar or parallel to the strip is particularly important when it is desirable to bond or mold the fastener strip to the surface of a flat object. Touch fasteners are often bonded to, or otherwise attached to objects such as room walls, toys, automotive seat cushions, etc. The surface bonded to is often generally flat or planar in nature. Bonding a straight strip of fastener to a flat surface as a simple straight strip may be relatively straightforward as the strip does not have to deform significantly to conform to the shape desired. When it is desirable to attach a fastener strip to a generally flat surface in a curved or otherwise non-straight geometry, the fastener strip is typically cut into small pieces and attached intermittently so as to create a form approximating the curve or geometry desired. Curved shapes of fasteners may be cut from large sheets of fastener product, but this often is wasteful and requires custom orders, additional inventory and advanced planning to acquire the various geometries desired.

To allow a touch fastener strip to be bent into a curved geometry, touch fasteners may often be made compliant by cutting the strip-like product intermittently along one or both sides thus producing a backbone like structure as depicted in FIG. 3A. This allows the product to be bent (arrow C) as required as depicted in FIG. 3B into a curved shape still having a flat surface. In FIGS. 3A and 3B, the projections from the surface of the strip 10B may be hooks 14, loops 16 or mushroom heads 18 or other fastening elements.

Touch fasteners may sometimes be cut into a series of discreet pieces 20 and re-joined together with a flexible center spine 22 added to join the pieces together and provide the product 10C as depicted in FIG. 4A. This allows the product to be bent and formed (arrow C) into various shapes that lie in a single plane as required as depicted in FIG. 4B. Variations of this design wherein the discrete pieces and spine are integrally molded together to produce a strip are contemplated as well.

Another method of providing a flexible strip 10D may include slits or apertures 24 that may be cut into the base 12 of the fastener strip 10D to make the strip more compliant as depicted in FIG. 5A. This allows the product to be bent (arrow C) as required as depicted in FIG. 5B.

Textile fasteners may often be produced with elastomeric fibers woven into the strip to allow the ribbon-like strip to be stretched, flexed or bent as required by an application.

Although the intermittent cutting of the edges of a fastener strip may allow it to be more compliant, this is often undesirable when the application requires a continuous fastener with a more uniform distribution of fastening elements along its length. A typical application that would benefit from this would be the use of particularly aggressive and strong fasteners for fastening the upholstery fabric onto automotive seat cushions as depicted in FIG. 6A. In FIG. 6A, a seat 100 for an automobile may include a foam seat cushion 102 and a foam seat back 104 in an upright configuration, with a plurality of fastener strips 10 or 10A, mounted to the foam seat surface to securely fasten a seat cover 200 to the foam cushion 102, 104.

In this application, one of the fastening elements (the hook side 10 for example) is molded into or bonded onto the outer surface of a urethane seat cushion 102. The seat cover 200 is prepared with the mating material (the loop side 10A for example) in the appropriate location for mating with the hook-containing strip 10 during assembly of the cover 200 to the urethane cushion 102, 104. A cross section of a seat cushion depicting the hook 10 and loop 10A fastener strips in an overlying position ready to be engaged (arrow D) is depicted in FIG. 6B. The fastening strips may be applied to the urethane cushion as straight strips (FIG. 6A) or may be applied as curved strips to accommodate aesthetic as well as functional needs as depicted in FIG. 6C.

The fastener strips used for these automotive seating applications are often molded in place during the casting of the urethane seat cushion by inserting the fastener into the mold before the liquid urethane precursors are poured into the foaming mold. The fastener strip may generally be non-permeable to prevent the liquid urethane material from penetrating through the base of the fastening strip and contaminating the fastening elements.

The fastening strip closures used for automotive seating are also subjected to high use loads by the end user. The forces applied when an end user sits in a seat or moves around in their seat may cause the fastening strip to disengage or tear from the urethane foam seat cushion surface. It is therefore desirable to distribute these loads over a large portion of the urethane foam seat cushion surface to avoid tearing the fastener strip away from the urethane cushion during use. It is also desirable to have a high force of fastening using a minimal amount of fastener strip to the seat cushion to allow for design flexibility and reduce costs. The use of intermittent or notched fastener strips may not allow for such high forces of fastening. This may be because a significant amount of the surface of the notched fastener strip, i.e. the gap space in the fastening strip, does not contain fastening elements. The gaps or intermittent nature of the strip may be further undesirable as they reduce the bonding area with the urethane foam thereby reducing the strength of the foam to fastener bond.

Fasteners strips which are non-compliant or poorly comply with the surfaces being bonded may make the seat cushion stiff in regions local to the fastener strips. This stiffness often telegraphs through the seat covering thus making the seat uncomfortable to the end user. It is therefore desirable that the fastener strips be compliant in multiple planes to minimize or eliminate stiff or hard spots in the finished seat.

Accordingly, a need exists for a cost-effective touch fastener strip that is flexible in multiple planes yet can maintain the required fastening performance. The following disclosure describes such fastener strips and the methods for producing them. Although the terms "tape" or "strip" are used throughout the disclosure below, the present invention is not limited to these configurations for touch fasteners. Although the terms hook and loop fastener and strip are used below, any fastener that is capable of mechanical fastening is contemplated herein.

SUMMARY

In a first embodiment, the present disclosure relates to a touch fastening strip comprising a base portion having two sides wherein the base is connected to at least two opposing side walls forming a plurality of channels extending from one side of the base. The strip also includes a top portion connected to the opposing side walls and fastening elements positioned on one side of the base or on the top portion wherein said strip includes one or more openings in the channels.

In a second embodiment, the present disclosure relates to a touch fastening strip comprising a planar base having two sides wherein the base is connected to at least two opposing side walls forming a plurality of channels extending from one side of the base. The fastening strip also includes a planar top wall connected to the opposing side walls and fastening elements positioned on one side of the base or on the top wall wherein the opposing side walls as connected to the planar top wall defines an angle of 45° to 179°.

In a third embodiment the present disclosure relates to a method for forming a touch fastening strip comprising supplying polymer material into a nip between a molding roll having a corrugated surface including fastener cavities and a complimentary device and forcing the polymer material into the corrugated surface and fastener cavities and forming a fastener strip. Such fastening strip comprises a base portion having two sides wherein the base is connected to at least two opposing side walls forming a plurality of channels extending from one side of the base, a top portion connected to the opposing side walls and fastening elements positioned on one side of the base portion or on the top portion.

In a fourth embodiment the present disclosure relates to a method for forming a touch fastening strip comprising supplying a fastener strip containing fasteners and feeding the strip between complimentary rollers wherein the rollers include projecting teeth wherein the teeth deform the fastener strip and provide a fastening strip. The fastening strip comprises a base portion having two sides wherein the base portion is connected to at least two opposing side walls forming a plurality of channels extending from one side of the base, a top portion connected to the opposing side walls and fastening elements positioned on one side of the base or on the top portion.

In a fifth embodiment the present invention relates to a method for forming a touch fastening strip comprising supplying a fastener strip containing fasteners and feeding the strip into a mold having a corrugated surface where vacuum and/or pressure is applied to the strip to form a fastener strip. The fastener strip comprises a base portion having two sides wherein the base portion is connected to at least two opposing side walls forming a plurality of channels extending from one side of the base portion, a top portion connected to the opposing side portion and fastening elements positioned on one side of the base or on the top portion.

In a sixth embodiment, the present disclosure relates to a method of forming a touch fastening strip comprising supplying a fastener strip containing fasteners and feeding the strip onto a roller having a corrugated surface where vacuum is applied to the strip to form a fastener strip. The fastening strip comprises a base portion having two sides wherein the base portion is connected to at least two opposing side walls forming a plurality of channels extending from one side of the base portion, a top portion connected to the opposing side walls and fastening elements positioned on one side of the base or on the top portion.

BRIEF DESCRIPTION OF THE DRAWINGS

The features, operation and advantages of the invention may be better understood from the following detailed description of the preferred embodiments taken in conjunction with the attached drawings, in which

FIG. 6A is a perspective view of an exemplary automotive seat and the use of touch fastener strips in an automotive foam seat;

FIG. 6B is a cross-sectional view of the use of touch fastener strips to assemble a seat cover to the seat of FIG. 6A;

FIG. 6C illustrates the use of touch fastener strips having a curved configuration in a foam seat;

DETAILED DESCRIPTION

Figure 1A:
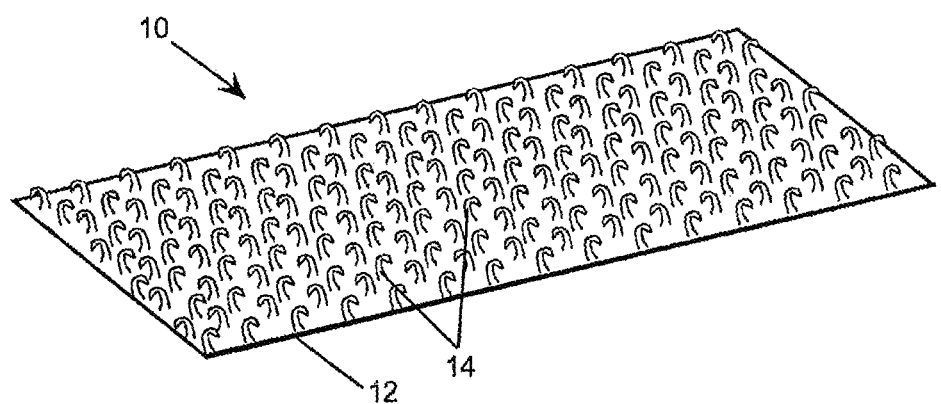
FIG. 1A is a perspective view of a prior art fastener strip for a touch fastener system.
Figure 1B:
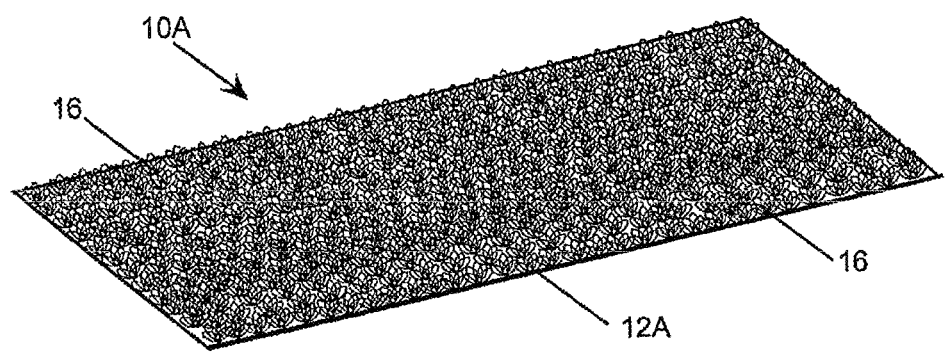
FIG. 1B is a perspective view of a mating prior art strip for a touch fastener system.
Figure 1C:
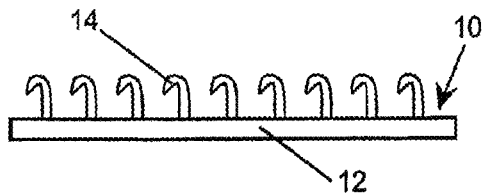
FIG. 1C illustrates in cross-section, the fastener strip of FIG. 1A with hook-shaped fasteners projecting from one surface.
Figure 1D:
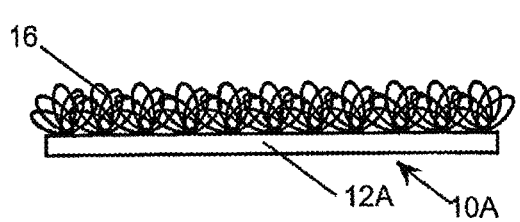
FIG. 1D illustrates in cross-section, the fastener strip of FIG. 1B with loops emanating from one surface.
Figure 1E:
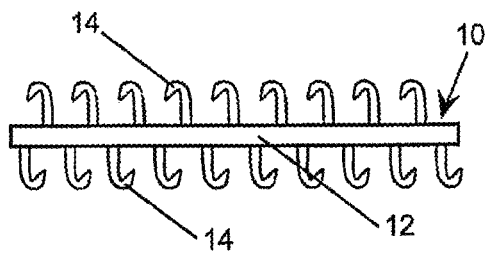
FIG. 1E illustrates in cross-section, the fastener strip of FIG. 1A with hook-shaped fasteners projecting from both surfaces of the base.
Figure 1F:
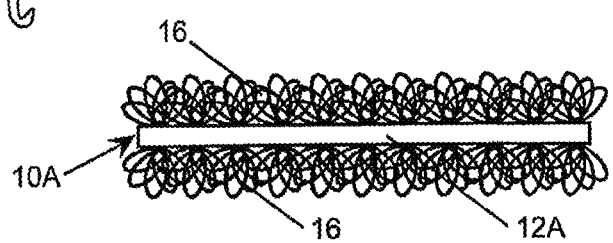
FIG. 1F illustrates in cross-section, the fastener strip of FIG. 1B loops emanating from both surfaces of the base.
Figure 1G:
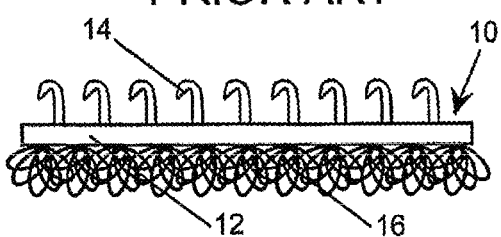
FIG. 1G illustrates in cross-section, the fastener strip of FIG. 1A with hook-shaped fasteners projecting from one surface and loops emanating from the opposite surface.
Figure 1H:
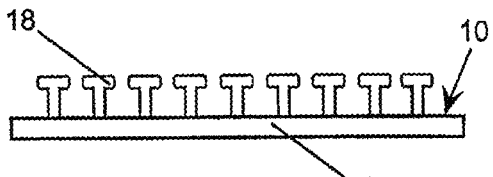
FIG. 1H illustrates in cross-section, the fastener strip of FIG. 1A with mushroom-shaped fasteners projecting from one surface.
Figure 1I:
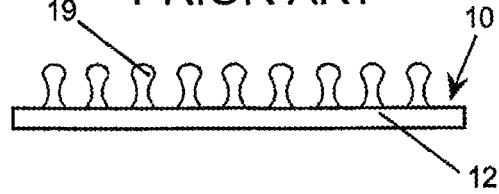
FIG. 1I illustrates in cross-section, the fastener strip of FIG. 1A with bulb-shaped fasteners projecting from one surface.
Figure 2A:
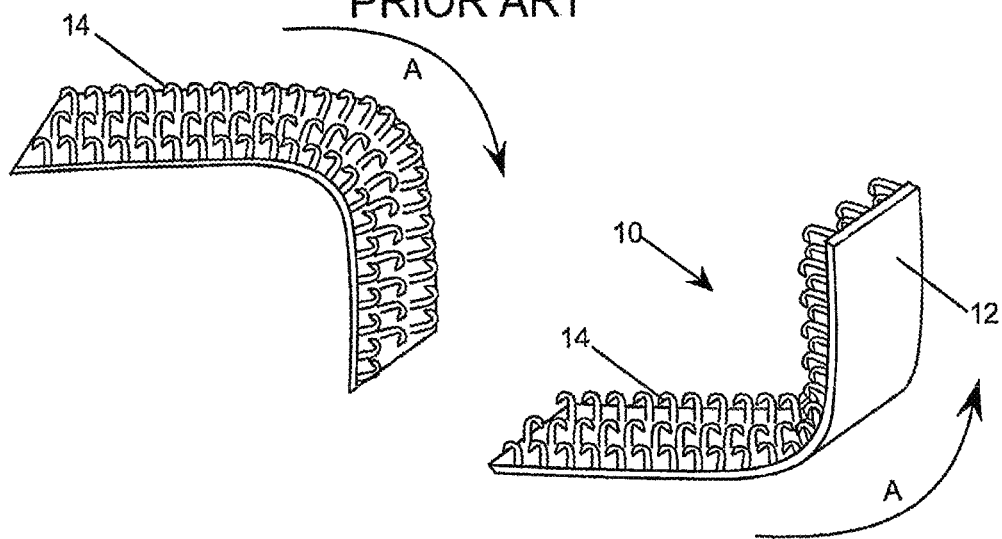
FIG. 2A is a perspective view of the strip of FIG. 1A being capable of bending in a plane generally perpendicular to either surface of the strip.
Figure 2B:
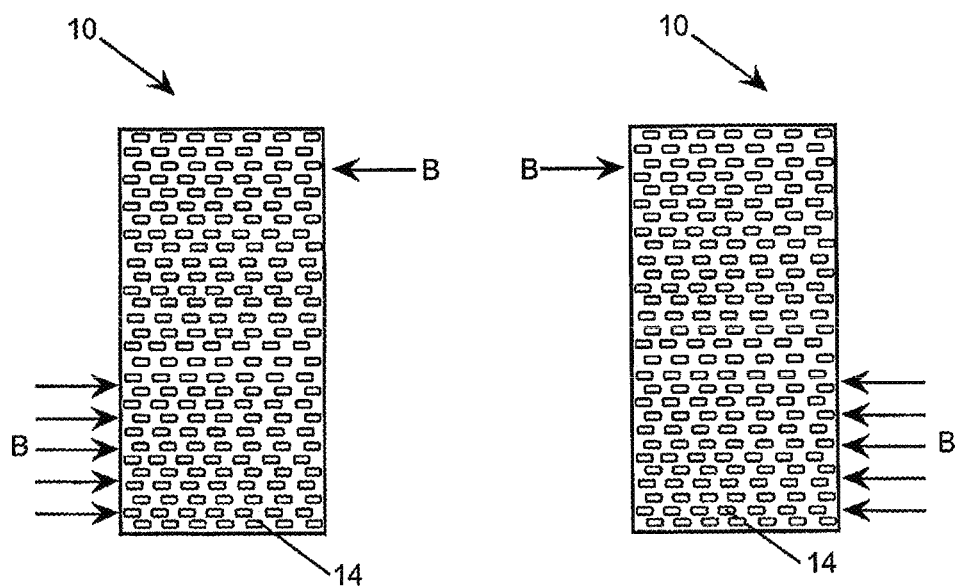
FIG. 2B is a perspective view of the strip of FIG. 1A being essentially incapable of bending in a plane generally parallel to the surface of the strip.
Figure 3A:
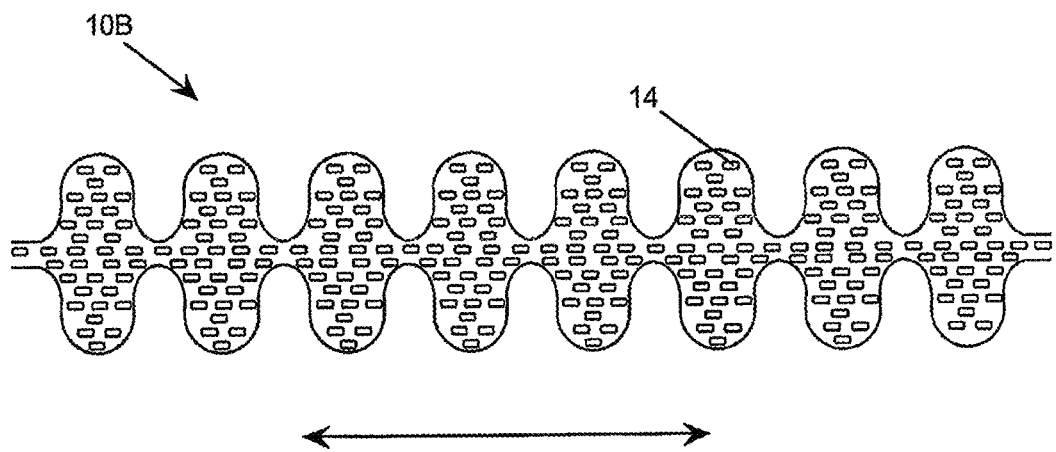
FIG. 3A is a top view of a prior art backbone-like structure for providing a strip that may be bent in a plane generally parallel to the base of the strip.
Figure 3B:
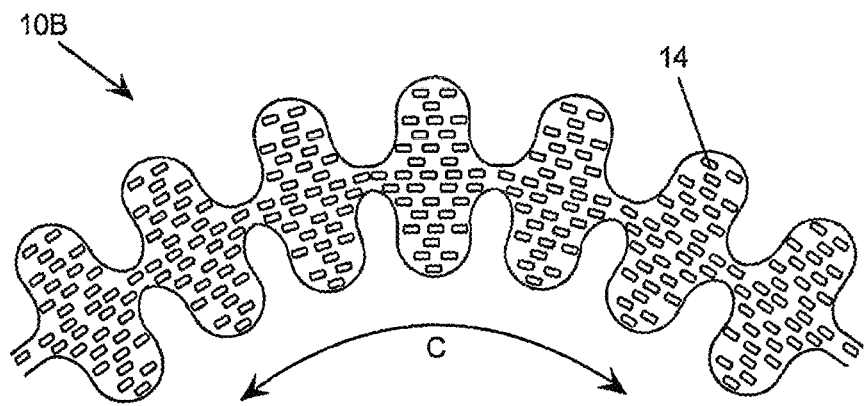
FIG. 3B is a top view of the structure of FIG. 3A bent into a curved shape and still having a relatively flat surface.
Figure 4A:
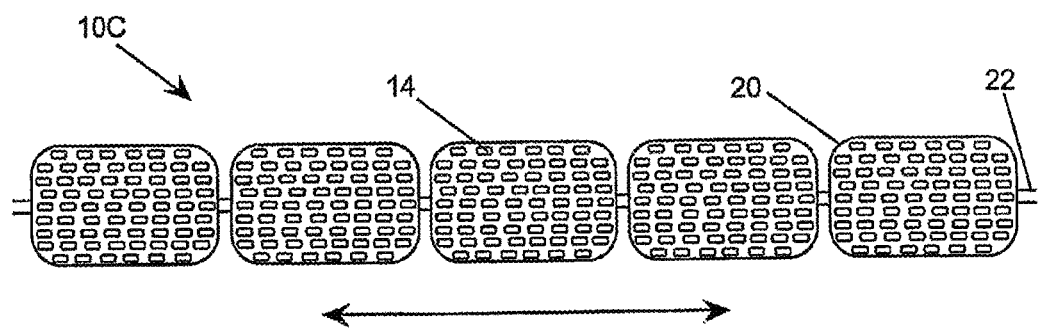
FIG. 4A is a top view of another prior art means of providing a structure that can be bent along the plane of the base structure.
Figure 4B:
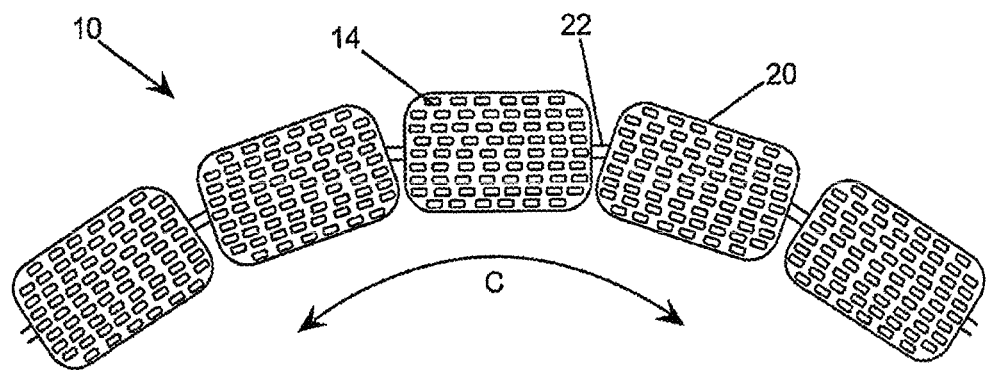
FIG. 4B illustrates the bent shape of the structure of FIG. 4A.
Figure 5A:
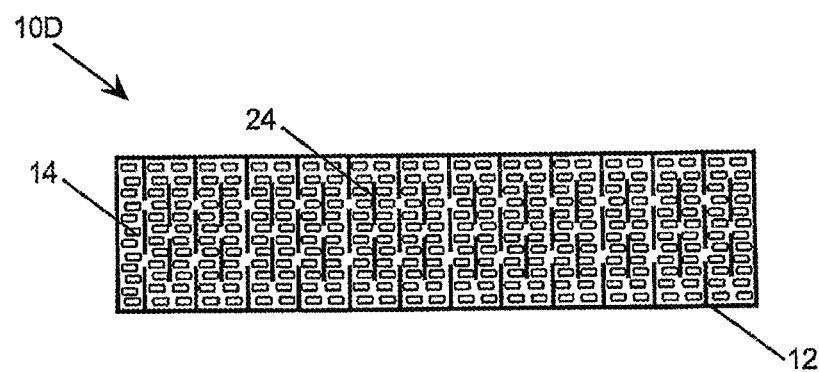
FIG. 5A is a top view of another prior art means of providing a structure that can be bent along the plane of the base structure.
Figure 5B:
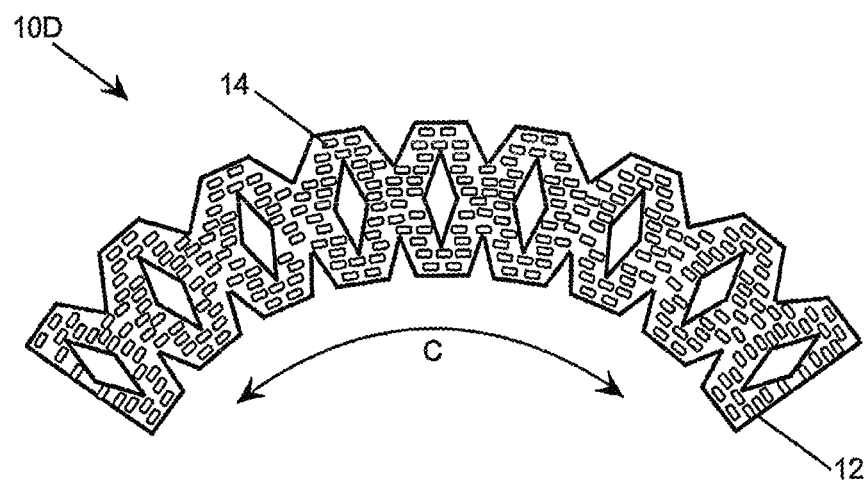
FIG. 5B illustrates the bent shape of the structure of FIG. 5A.

Still other objects and advantages of the present disclosure will become readily apparent to those skilled in the art from the following detailed description, wherein it is shown and described preferred embodiments of the disclosure. As will be realized, the disclosure is capable of other and different embodiments, and its several details are capable of modification in various respects, without departing from the disclosure. Accordingly, the description is to be regarded as illustrative in nature and not as restrictive.

For elements common to the various embodiments of the present disclosure, the numerical reference character between the embodiments is held constant, but distinguished by the alphanumeric character to the existing reference character. In other words, for example, an element referenced at 10 in the first embodiment is correspondingly referenced at 10A, 10B, and so forth in subsequent embodiments. Thus, where an embodiment uses a reference character to refer to an element, the reference character applies equally, as distinguished by alphanumeric character, to the other embodiments where the element is common.

Where a flexible touch fastener product (strip or tape) is desired, the base 12, 12A of the fastening strip 10, 10A may be shaped with a corrugated type topology. One such exemplary topology is depicted in FIG. 7A.

Figure 7A:
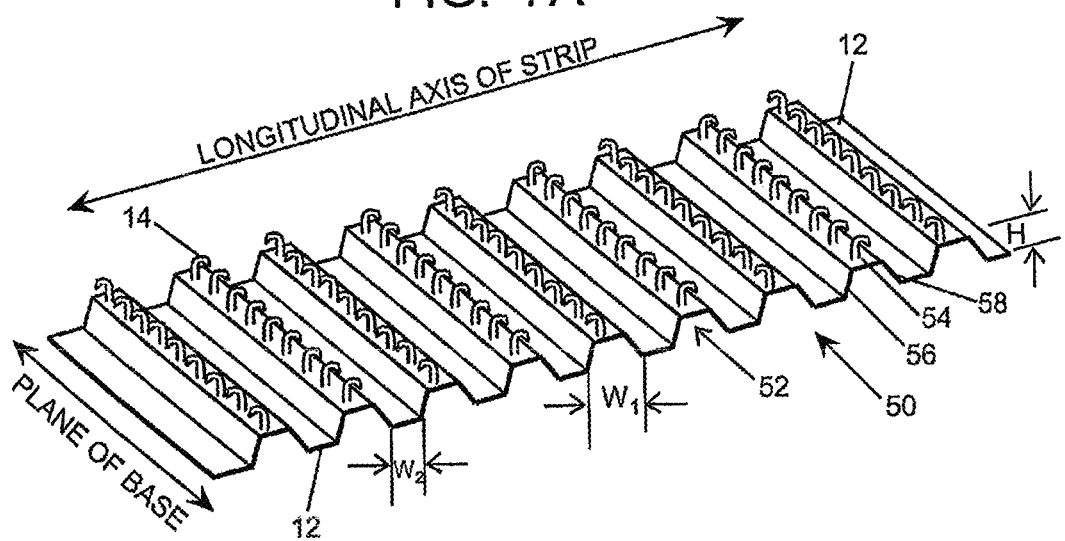
FIG. 7A is a perspective view of an exemplary corrugated touch fastening strip formed with a plurality of channels, according to the present disclosure.

FIG. 7A is a perspective view of an exemplary corrugated touch fastening strip 50 formed with a plurality of channels 52 extending from one side of the base 12. The channels 52 further include hook elements 14 projecting from the top wall 54 of the channel 52. As shown in cross-section in FIGS. 7B-7I, other fastening elements known in the art, including, but not limited to, loops 16 and mushroom-shapes 18, may also be used on the base 12 and project from any of the surfaces of the base and/or channels.

The base 12 may be woven, molded or post-formed into the corrugated shape 50 using various methods as described herein. Fastening elements (mushrooms, hooks, loops, etc. or combinations thereof) may be present along all or part of the corrugated surfaces as desired.

Figure 7B:
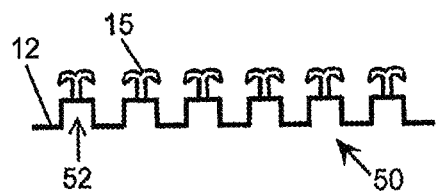
FIGS. 7B-7I illustrate cross-sectional views of the corrugated fastener strip of FIG. 7A with hook type elements, mushroom type elements, and loop styled elements in various positions on the corrugated strip.
Figure 7C:
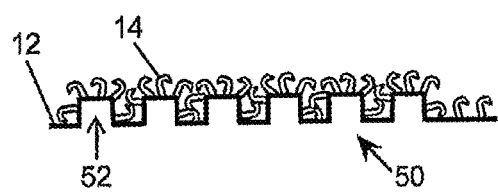
Figure 7D:
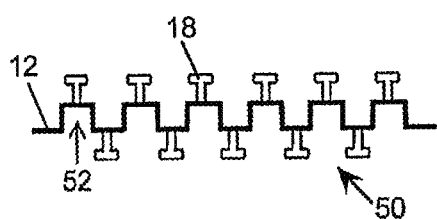
Figure 7E:
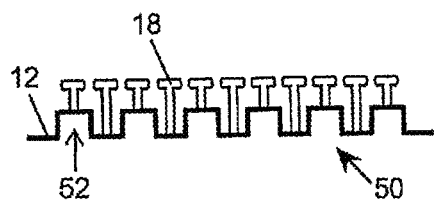
Figure 7F:
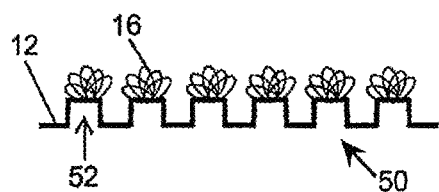
Figure 7G:
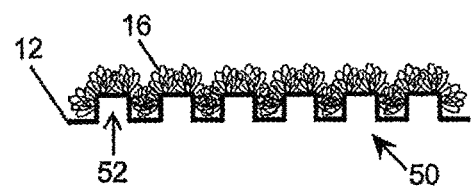
Figure 7H:
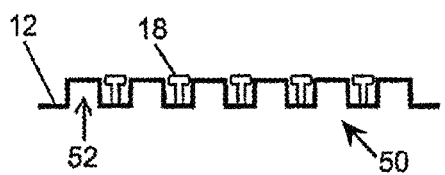
Figure 7I:
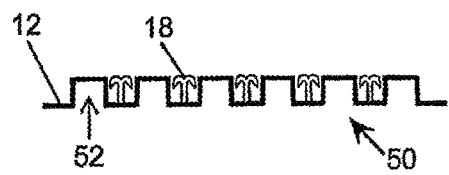

Several possible configurations having fastening elements projecting therefrom are depicted in FIG. 7B though FIG. 7I.

By "corrugated" as used herein, it is meant that the base 12 of the strip 50 is formed into a plurality of channels 52 which may extend outwardly from one or both sides of the base.

(See FIG. 7A.) Such channels may be preferably formed perpendicular to the longitudinal axis of the strip. It is contemplated, however, that the plurality of channels may be formed at any angle to the longitudinal axis of the strip, including parallel, perpendicular and all angles in between (e.g. from 1 degrees to 90 degrees in 1 degree increments). Accordingly, the corrugations may extend in one or more directions, such as in the machine direction, crossmachine direction, angled to machine direction or any combination thereof. Furthermore, the channels may be intermittent or discontinuous lengthwise; i.e. they may start and stop along their length on a given strip.

Preferably, the plurality of channels are essentially parallel with one another as illustrated in FIG. 7A, although it is contemplated that the channels may also be at an acute angle to one another (<90 degrees). The channels may also vary in height and width, one to the next to provide additional flexibility. By "channel" as used herein, it is meant an elongated shape formed into a base sheet wherein the shape includes two opposing side walls 56, 58 and, optionally, a top 54 or bottom wall 12 located between the side walls. See FIG. 7A. With only two walls, the channel will resemble a "pleat" while with the presence of a top or bottom wall the channel will resemble a "U"-shape. It is contemplated that the side walls may be parallel to one another or angled from each other laterally and/or longitudinally. The top or bottom wall may be flat, curved or multi-sided (for instance, having two or more straight or curved elements). The base 12 extends between the channels 52 interconnecting them.

In other words, channels 52 may be formed in all or only a portion of the fastener strip. They may be continuous or intermittent in nature. They may vary in pitch, height, density, angle or shape or any combination thereof within a single fastener strip 50.

The channels 52 which make up the corrugations may range from about 0.001" or less in 5 amplitude (H) to greater than 0.500" to permit the required flexibility such that the strip may be readily bent in a plane generally parallel to the surface of the strip. See FIG. 8B. The amplitude H may therefore be in the range of 0.001" to 2.0 inches. The width ($W_1$) of the channels 52 and the width between the channels ($W_2$) may vary from about 0.005" to about 2.50" in increments of 0.001", such as 0.006", 0.007", 0.008", etc. See FIG. 7A.

Fastening elements (mushrooms, hooks, loops, etc. or combinations thereof) may be positioned upon one or both surfaces of the channels or between the channels of the corrugated fastener strip or they may be positioned in specific areas as desired.

FIG. 7B through FIG. 7I depict exemplary corrugated fasteners with hook type elements 14, mushroom type elements 18, and loop styled elements 16 in various positions on the corrugated strip. These fastening elements, or other fastening elements providing mechanical engagement, may be produced on one or both faces in a continuous pattern or intermittent fashion.

For instance, FIG. 7B illustrates a corrugated strip 50 having double hooks 15 projecting only from the top wall of the channel 52. FIG. 7C illustrates a corrugated strip 50 having hooks 14 projecting from the sides and top wall of the channel 52 as well as from the base 12.

FIG. 7D illustrates a corrugated strip 50 having mushroom-shaped elements 18 projecting in one direction from the top of the channel 52 and in the opposite direction from the other side of the base 12 between the channels and not from the walls of the channel.

FIG. 7E illustrates a corrugated strip 50 having mushroom-shaped elements 18 projecting in the same direction from the top wall of the channel 52 and from the base 12 between the channels. FIG. 7F illustrates a corrugated strip 50 having loops 16 projecting only from the top wall of the channel 52.

FIG. 7G illustrates a corrugated strip 50 having loops 16 projecting from the top and side walls of the channel 52 as well as from the base 12 between and within the channels. FIG. 7H illustrates a corrugated strip 50 having mushroom-shaped elements 18 projecting only from the base between the channels 52. FIG. 7I illustrates a corrugated strip 50 having double hooks 15 projecting only from base 12 between the channels 52.

Figure 8A:
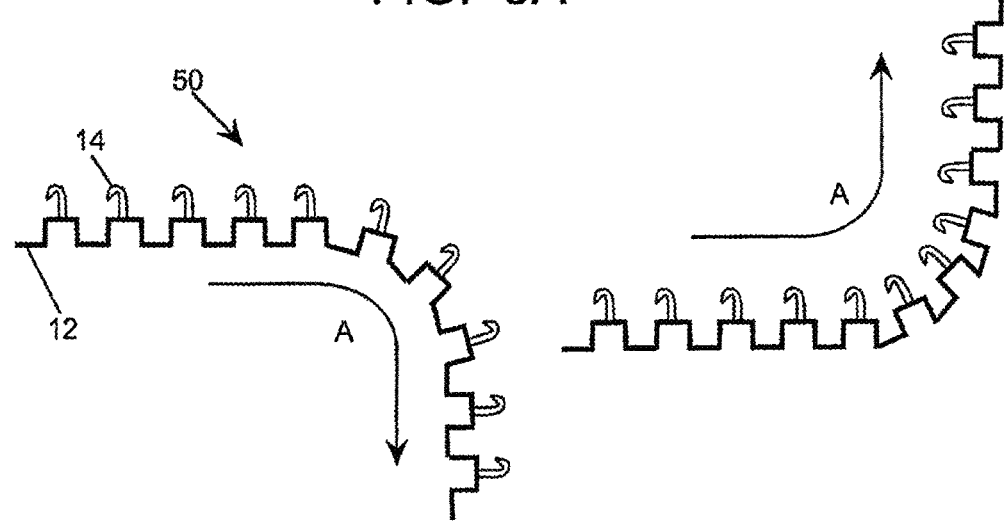
FIGS. 8A-8I are cross-sectional and/or top views of the exemplary corrugated strip, according to the present disclosure.
Figure 8B:
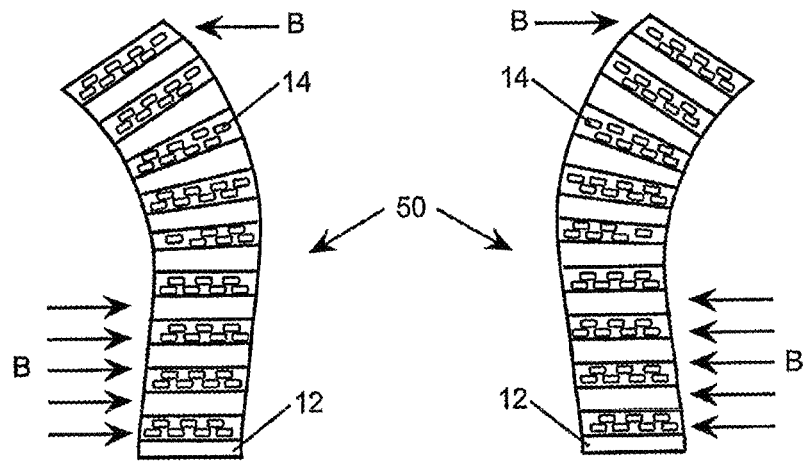

The corrugations allow the product to be bent and/or stretched in a plane that is generally parallel to the plane of the base 12 and thus provide a fastening strip that can be bent and still remain flat. The corrugations allow the fastening strip to be flexible or compliant when bent in a direction generally perpendicular to the base as depicted in FIG. 8A as well as in generally coplanar directions as depicted in FIG. 8B. The corrugations also allow the product to be stretched along the longitudinal axis of the base as is depicted in FIG. 8C.

FIG. 8A is a side view of the corrugated strip 50 with hooks 14 and illustrates the ease in bending the strip (arrow A) in either direction generally perpendicular to the plane of the base 12.

FIG. 8B is a top view of the corrugated strip 50 with hooks 14 and illustrates the ease in bending the strip (arrow B) in either direction generally parallel to the plane of the base 12.

Figure 8C:
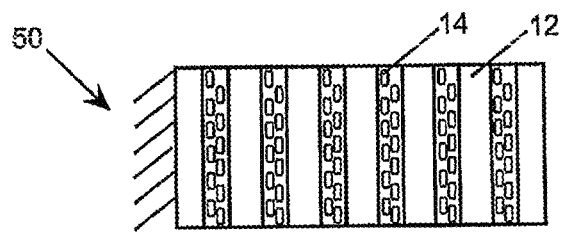
Figure 8E:
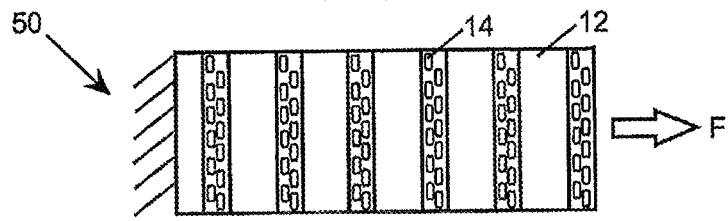
Figure 8D:
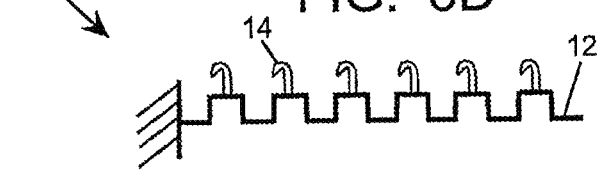
Figure 8F:
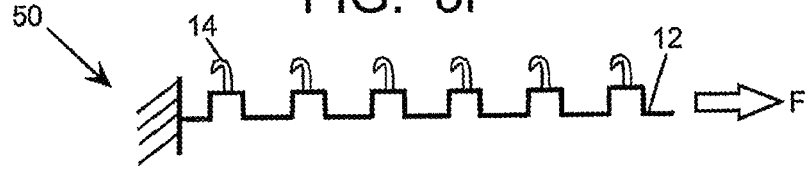

FIG. 8C is a top view of the corrugated strip 50 with hooks 14 in an unstretched condition and FIG. 8D illustrates the strip 50 in cross-sectional view, unstretched. FIG. 8E is a top view of the corrugated strip 50 with hooks 14 elongated or stretched (arrow F) in a direction essentially parallel with the longitudinal axis of the strip 50. FIG. 8F illustrates in cross-sectional view the strip elongated or stretched (arrow F) in a direction essentially parallel with the longitudinal axis of the strip 50.

Figure 8G:
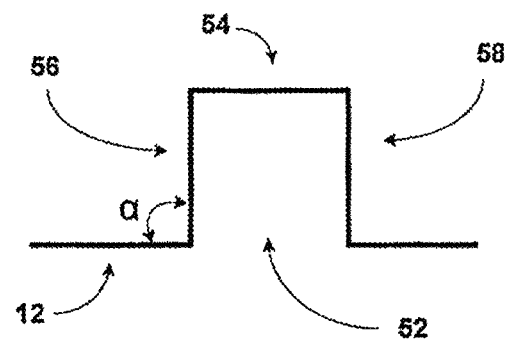
Figure 8H:
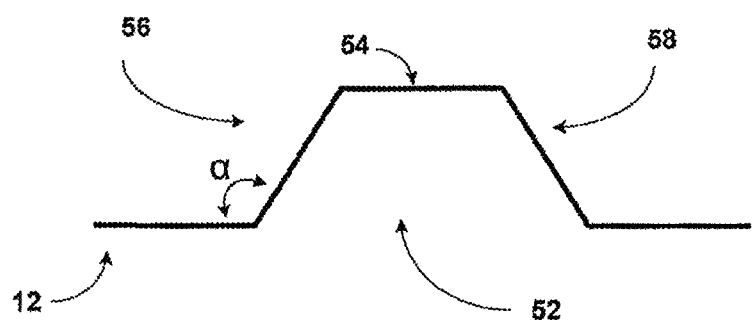

The above referenced bending of the corrugations may be conveniently defined as shown in FIGS. 8G and 8H. As shown in FIG. 8G, the corrugated fastening strip including the base 12 having sides 56 and 58 and top wall 54 may define an angle alpha ($\alpha$) between the base 12 and side walls (56 or 58). As shown in FIG. 8G this angle may have a value of 90° and as shown in FIG. 8H, when the corrugations are stretched, the angle may increase in value up to a value of 180° (fully stretched position). Accordingly, the value of the angle alpha ($\alpha$) may have a value of 90° to 180°.

Figure 8I:
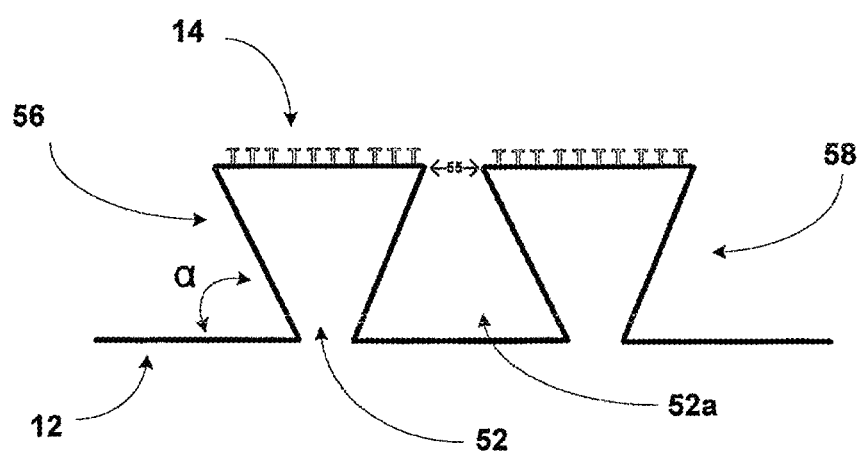

As next shown in FIG. 8I, the angle alpha ($\alpha$) may have a value of less than 90°, and may have a value as low as 45°. Accordingly, the angle alpha ($\alpha$) formed by the intersection of the planar top wall 12 and planar side walls 56 or 58 may range from 45° to 180° (fully stretched position). Of course, it may be appreciated that the higher the value of alpha ($\alpha$) in the as formed fastener will provide a fastener whose ability to stretch is then reduced (i.e. the higher value of alpha alters the geometry of the fastener such that less stretching can occur). Accordingly, in the non-stretched condition, the value of alpha ($\alpha$) herein may fall in the range of 45° to 179°.

In addition, reference herein to the feature that the base 12, side walls 56 or 58, and top wall 54 may individually or collectively be planar, may be understood as a wall portion that is relatively flat, and which is straight in two dimensions for at least a portion of its surface.

As may also be evident from FIG. 8I, in those situations where the value of alpha ($\alpha$) is less than 90°, the surface 54 of the fastener containing fastening elements 14 now may provide a relatively continuous surface of fastening elements when the product is in the unstretched condition. Accordingly, the fastener herein that is formed with plane-like top wall 54 and plane-like side walls 56 and 58 may be configured such that the plane-like top wall 54 is configured to provide a nearly continuous surface of fastening elements. That is, the distance between the plane-like top wall as between channels 52, identified as item 55 in FIG. 8I, may be on the order of 0.001-0.5 inches, more preferably in the range of 0.001-0.25 inches.

It may also be noted that with respect to the materials utilized to form the fastener configuration illustrated in FIG. 8I, and as discussed further herein, the materials are such that they are sufficiently flexible so that they may be removed from the apparatus the may be used to continuously form the fastener. See FIG. 16. In such context, those polymeric materials that have a flex modulus of less than or equal to 400,000 psi may preferably be employed. More preferably, the flex modulus of the material may be in the range of 75,000 psi to 225,000 psi.

It should be noted that the force to extend, stretch or otherwise deform the fastener herein is significantly less than other fasteners known in the art (e.g. such as the sinusoidal shaped fastener in U.S. Publication No. 2005/0161851). By utilizing planar side walls 56 and 58 the amount of force require to extend, stretch or otherwise deform the fastener is reduced due to the relative ease in bending the planar side walls. Computer modeling of the sinusoidal shaped fasteners compared to the fasteners herein demonstrated about a 20% increase in extension of the fastener over the sinusoidal shaped design, for a given applied force.

The plane-like top surface 12 of the fastener herein also provides a significant increase in the amount of fastening elements available for mating an opposing fastening strip. Relatively few of the fastening elements on the sinusoidal fastener as reported in the art (see again, U.S. Publ. 2005/0161851) are made available for engagement with opposing fastener elements due to the curvature of the top surface.

As discussed above, the ability to be bent in geometry generally coplanar to the strip 50 as well as other degrees of freedom is particularly important when it is desirable to bond or mold the fastener strip to the surface of an automotive seat cushion or other non-flat surface. The corrugated fastener strip 50 by being flexible in multiple planes allows the fastener strip to stretch or elongate along with the foam seat bun when a user sits in a seat thereby reducing or eliminating localized stiffness or hard spots in the seat. By choosing an appropriate pitch (height, width, spacing, etc.) for the channels the fastener strength may be maintained at desirable levels.

The corrugated strip 50 may be produced with or without apertures or other cuts if desired so as to maintain a barrier to contaminants such as liquids or gases encountered in the fastening process. This may prove beneficial if the corrugated products are used in applications, such as the automotive seating application discussed above, so as to reduce or eliminate the permeation of urethane foam into the fastening element area of the strip 50 during molding operations.

The use of a corrugated base as disclosed herein, may also allow the entire fastener (for instance, hooks and base) to be produced from a high modulus material if desired, thereby maintaining strong closure performance while allowing the product to be flexible. This may simplify manufacturing as well as reduces costs. Accordingly, the corrugated fastener strips herein may be manufactured from materials that have flex modulus values up to 500,000 psi.

Figure 9A:
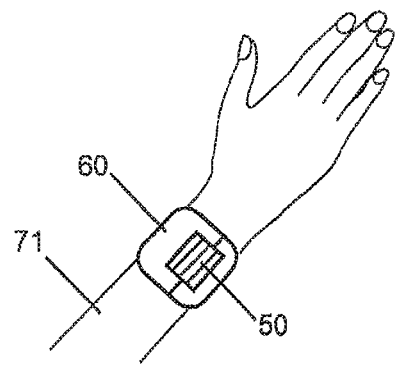
FIGS. 9A-9C illustrate the use of the exemplary corrugated fastening strip, according to the present disclosure, as a medical wrap or a portion of a medical wrap for the wrist or leg.

Corrugated fastener strips may be used to fasten medical wraps which may be used for supporting sprained wrists, ankles, etc. One such example is depicted in FIG. 9A. The flexibility and stretchability of the corrugated fastener strip 50 may provide more user comfort. The corrugated fastener strips may be produced with apertures if desired to allow the fastener to breath. It is also contemplated that all or only a portion of the wrap may be corrugated in a continuous and/or intermittent fashion and that all or only a portion of the wrap may contain fastening elements.

Figure 9B:
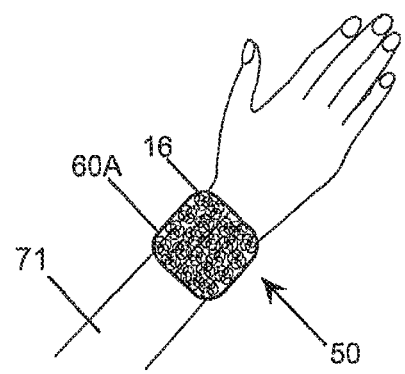
Figure 9C:
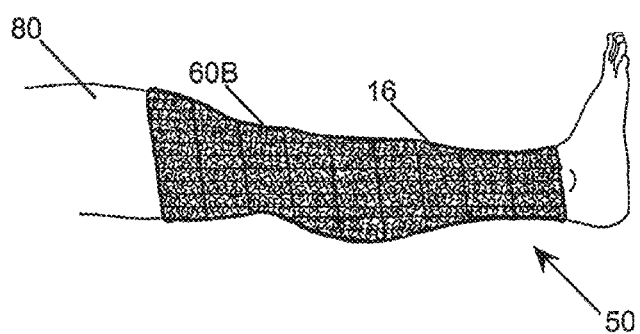

FIG. 9A schematically illustrates a medical wrap 60 for a wrist 71 including the corrugated fastener strip 50 of the present disclosure. FIG. 9B is an illustration of a medical wrap 60A for a wrist 71 that comprises a corrugated fastener strip 50 having hooks (not shown) on one side and loops 16 on the other side such that the strip 50 may adhere to itself. FIG. 9C is an illustration of a medical wrap 60B for a leg 80 that comprises a corrugated fastener strip 50 having hooks (not shown) on one side and loops 16 on the other side such that the strip 50 may adhere to itself. A spiral wrap 60B due to the corrugated construction may provide a flexible, stretchable material in one direction while providing support or structural stiffness in another direction. As noted above, various combinations of fastening elements may be utilized on either or both sides of the strip. The corrugated fastener strips and/or wrap may be produced with apertures (see FIG. 10D), if desired, to allow the strip/wrap to breathe.

When used in applications such as infant diapers or adult incontinence products, touch fasteners may be attached to a "side tab" closure that the consumer uses to secure the diaper to the infant or adult. In these applications, the flexibility and/or stretchability of a corrugated fastening tape may eliminate or reduce discomfort to the user. Fastening tapes disclosed in the art typically do not stretch and therefore may be attached to the disposable garment in combination with elastomeric fabrics to enhance the flexibility of the closure. The use of corrugations in the base of the fastener strip, as herein disclosed, may eliminate the need for adding elastomeric fabrics or other materials to the disposable garment or may be used to supplement the use of elastomeric fabrics or other materials. Part or all of the fastening tape may be corrugated as described herein. Some examples of corrugated diaper tabs are depicted in FIGS. 10A-F. In some cases, the corrugated strip 50 may include apertures 94 or otherwise made breathable for applications such as these. It is also anticipated that a portion of the diaper adjacent to the fastener may also be corrugated and may contain fastening elements in or adjacent to the corrugated areas.

Figure 10A:
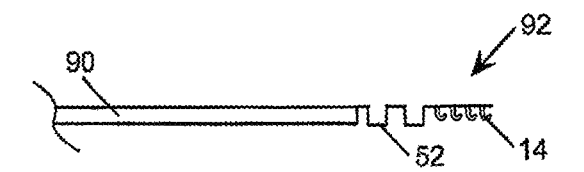
FIGS. 10A and 10B illustrate the exemplary corrugated fastener strip, according to the present disclosure, in top and front views respectively, as a closure tab for a diaper, with fastening elements only at the end of the closure tab.
Figure 10B:
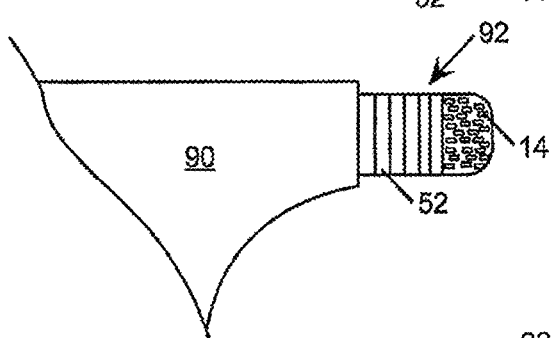

FIGS. 10A and B illustrate in top view and front view, a diaper 90 including a closure tab 92 formed of a corrugated fastener strip 50 as disclosed herein, the strip including hook elements 14 (or other fastening elements) only at the end portion of the base 12 and not on the channels 52.

Figure 10C:
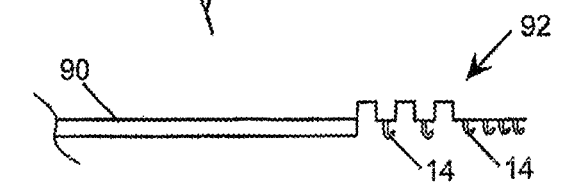
FIGS. 10C and 10D illustrate the exemplary corrugated fastener strip, according to the present disclosure, in top and front views respectively, as a closure tab for a diaper with fastening elements on the top wall of the channels.
Figure 10D:
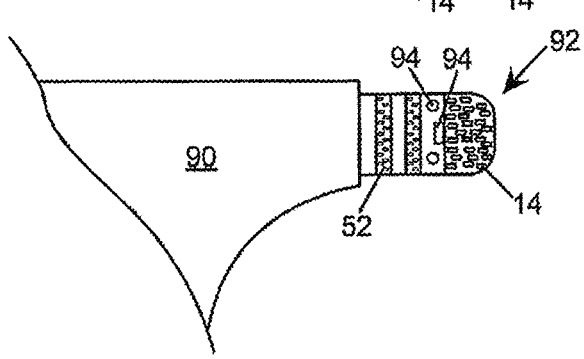

FIGS. 10C and D illustrate in top and front view a diaper 90 including a closure tab 92 formed of a corrugated fastener strip 50 as disclosed herein, the strip including hook elements 14 (or other fastening elements) at the bottom of the channels and at the end portion of the base 12.

Figure 10E:
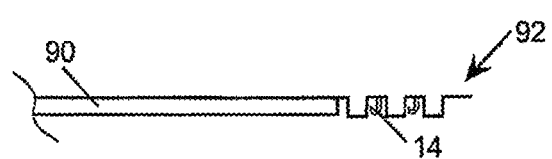
FIGS. 10E and 10F illustrate the exemplary corrugated fastener strip, according to the present disclosure, in top and front views respectively, as a closure tab for a diaper with fastening elements in between the channels.
Figure 10F:
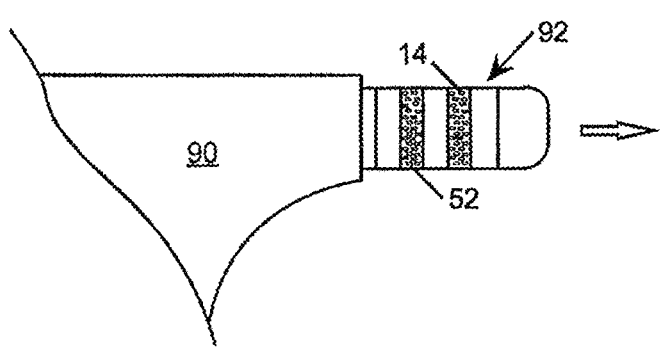

FIGS. 10E and F illustrate in top and front views a diaper 90 including a closure tab 92 formed of a corrugated strip 50 as disclosed herein, wherein the fastening elements lie only between the channels 52 within the channel to allow for a tactile smooth surface. Upon attachment the force (arrow G) applied to the tab or stretching of the tab would present the fastening elements for attachment to a mating surface.

Figure 11A:
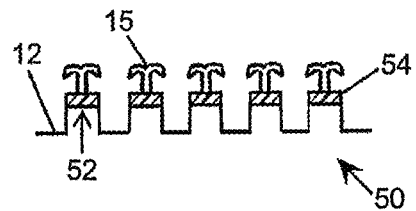
FIGS. 11A and 11B are cross-sectional views of the exemplary corrugated fastener strip, according to the present disclosure, illustrating different portions of the base or the channels having a greater wall thickness than the adjacent wall thickness.
Figure 11B:
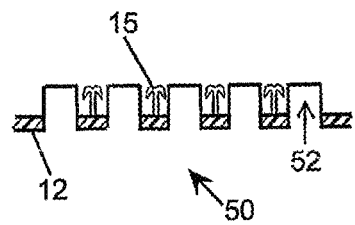

As illustrated in FIGS. 11A and 11B, the thickness of the top 54 (or bottom or sides) wall of the channel 52 in the corrugated regions may be less than, equal to, or greater than the thickness of the base in the balance of the strip. FIG. 11A illustrates a corrugated strip 50 having a base 12 and channels 52 with a thicker top wall 54 than the side walls or base, and double hooks 15 projecting from the thicker wall 54. FIG. 11B illustrates a corrugated strip 50 having a base 12 and channels 52 with the base being thicker than the walls of the channel and double hooks 15 projecting from the base 12.

By adjusting the relative thickness of the side walls 56 and 58 to be relatively thinner than the base 12 or top wall 54, the flexibility of the fastener herein may be increased while the strength of the interface where the fastening elements attach to the base or top wall, may be maintained. When a load is applied to the fastening elements it is common for the base material to deflect thereby causing the fastener to decouple from the mating elements prematurely. Maintaining the base or top wall as relatively thicker, where the fastening elements are located, may now provide for a relatively stronger fastener while allowing for a reduction in the amount of material that is necessary to produce the fastener (i.e. less material use in the relatively thin side wall sections 56 and 58.

Figure 12:
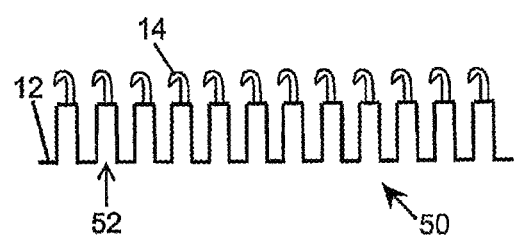
FIG. 12 illustrates in cross-section a high density of corrugations including hook fasteners, according to the present disclosure.

FIG. 12 illustrates in cross-section, that a high density of fastening elements may be maintained with the channels 52 occupying the space between adjacent fastening elements 15.

Figure 13:
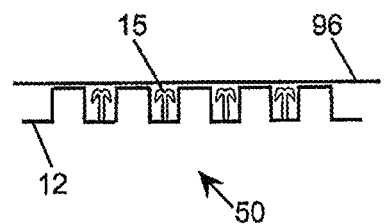
FIG. 13 illustrates in cross-section the use of a protective cover for the fastening elements, according to the present disclosure.

In another exemplary embodiment, a film or other protective material 96 may be applied 15 to the corrugated fastener strip 50 which may temporarily shield or protect the fastening elements 15. One such configuration is depicted in FIG. 13. Touch fastener products for use in automotive seating applications (see FIGS. 6A-6C) may benefit from the protective cover 96 during the foam molding operation for the seat cushion. The cover 96 may protect the fastening elements 15 from contamination during the pouring and expansion of urethane precursors in the foaming mold. Provisions may be made for sealing the edges as well as the ends of the protective cover 96 to the fastener strip, thereby providing protection from contamination in multiple directions during a molding operation. The edges of the corrugated strip may be flat, corrugated or otherwise shaped to provide a temporary shield.

The protective material may comprise adhesives, foams, gaskets, coatings or other materials in addition to or in place of a polymeric film material. If used, the protective film 96 may be removed, melted or otherwise made ineffective subsequent to the molding operation to allow the fastening elements to be made available for mating with a complimentary fastener strip. In addition it is contemplated that the spaces 52a between the channels 52 may be filled with a compliant material that may be removed before engagement with another mating strip or may be compressed to expose the heads of the fastening elements to allow engagement.

Figure 19A:
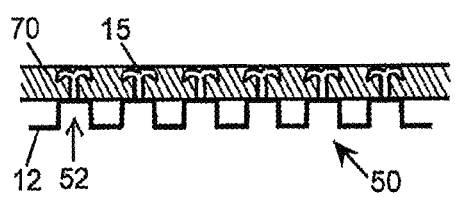
FIGS. 19A-D are sectional views of the corrugated fastener strip, according to the present disclosure, including a protective compliant material for the fastening elements.

As shown in FIG. 19A, a protective material may include a compliant material 70 that may be located along the top of the corrugated strip 50 in a manner that partially or fully encapsulates and similarly protects the fastener elements 15 but does significantly penetrate into and contact the base between the fastener elements. In other words, the corrugated strip 50 may have fastening elements 15 on, for instance, the top surface 54 of the channels 52 and the compliant material 70 may partially or totally encapsulate these fastening elements 15 to protect them from contamination during a molding or other assembly operation. A portion of the fastener element may protrude through the compliant material so as to allow the fastener to function, in which the case the compliant material need not be removed. As noted above, the compliant material may be, for instance, a layer of soft foam that may be pressed onto the corrugated strip and allow the fastening elements to penetrate and be protected.

Figure 20A:
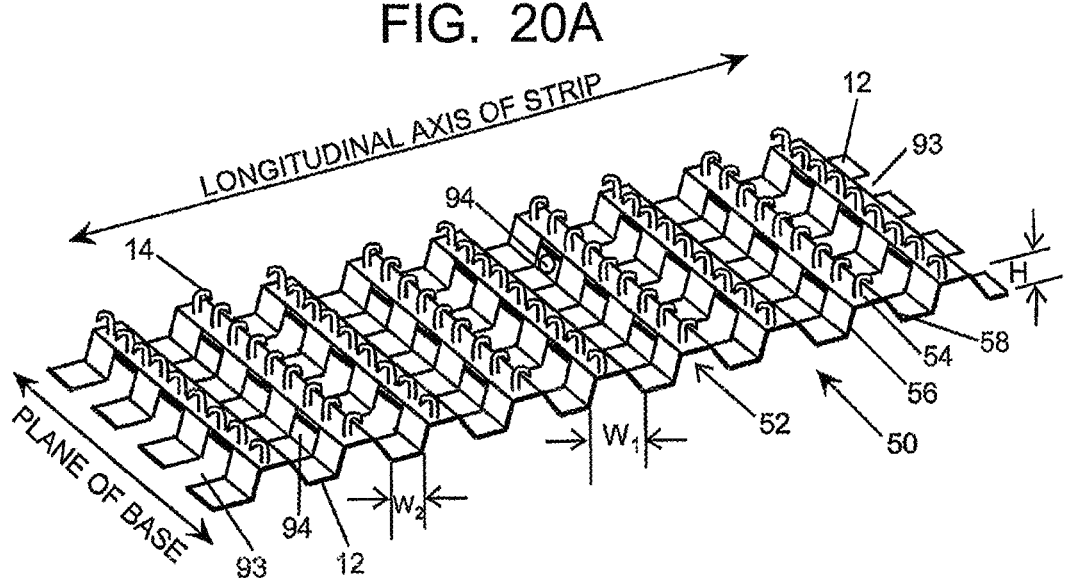
FIG. 20A is a perspective view of an exemplary corrugated touch fastening strip formed with apertures and notches on the plurality of channels, according to the present disclosure.
Figure 19B:
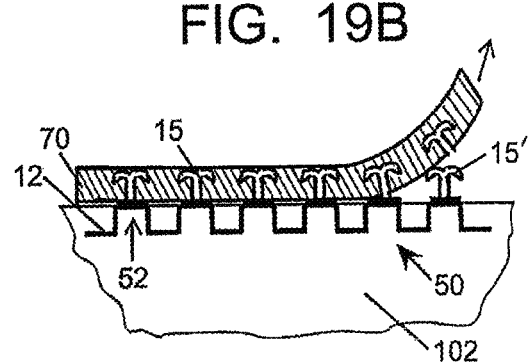
Figure 19C:
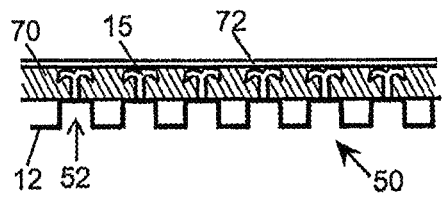

In the case of automotive seating as in FIGS. 6A-C, the molding material (in some cases urethane foam) may penetrate into the channels from the sides (and also thru any apertures in the channels which may help anchor the strip to the molded product, FIG. 20A). As shown in FIG. 19B, when the compliant material 70 is subsequently stripped from the fastening elements 15 after the molding operation (foam seat 102), numerous hooks 15' may be visible on the surface of the molded seat 102. Fastening elements may be present in the channels and/or below the channels to aid in the anchoring, but only the top level of fastening elements 15' (those that are to be available for engagement) are preferably encapsulated or otherwise shielded from contamination during molding. FIGS. 19C and D illustrate the addition of a sheet 72 of crepe, corrugated or other deformable material to the top surface of the compliant material layer 70 to add strength for stripping the layer from the fastening elements 15.

The compliant material 70 may include, but not be limited to, a foamed thermoplastic such as PVC, or thermosetting foam materials, such as urethane foams. The compliant material 70 may contain metallic powders or other materials that may allow the compliant material to be made attractive to magnetic forces. Such material may contain magnetic materials or materials that may be subsequently magnetized to make the compliant material attractive to other magnetic materials or attractable materials, such as iron, etc. This may be useful in locating the strip 50 to a metal foaming mold such that the strip may be foamed in place. The layer of compliant material may be sufficiently thick to just cover the fastening elements, for instance, about 0.050 inches thick.

FIG. 20A illustrates that the corrugated strip 50 may include openings such as notches 93 and/or apertures 94 to provide additional conformity to a curved surface, such as an automotive seat cushion, and further, may allow the liquid expanding foam mass to anchor the channels to a seat surface. The apertures and notches may be in any or all of the walls (52, 54, 56) or base 12 or 12A.

The compliant material may be applied to the corrugated strip in such a manner so as to allow the compliant strip to be subsequently removed from the corrugated strip in one or more pieces. (FIGS. 19B and D) The compliant material may be applied so as to fill the spaces between the channels 52 and also create a layer of compliant material above the top of the channels 52, thereby creating a continuous surface of compliant material that may allow the compliant material to be removed as one or more continuous strips.

The corrugated strip may be configured with the compliant material applied to the top portion of the corrugated strip so as to encapsulate the fastening elements located on the top of the channels but not penetrating significantly into the channels, thus leaving the spaces between the channels predominately open. (FIGS. 19A and C) In applications where the corrugated strip may be insert-molded, the spaces between the channels 52 may serve to allow the molded material to flow in so as to anchor or assist in anchoring the strip to the molded part. As noted above, the channels may be notched or otherwise apertured and/or may contain fastener elements or have other materials such as loop fabric, non-wovens, etc. laminated or attached in some fashion that may serve to enhance anchoring of the corrugated strip into a molded object.

Figure 19D:
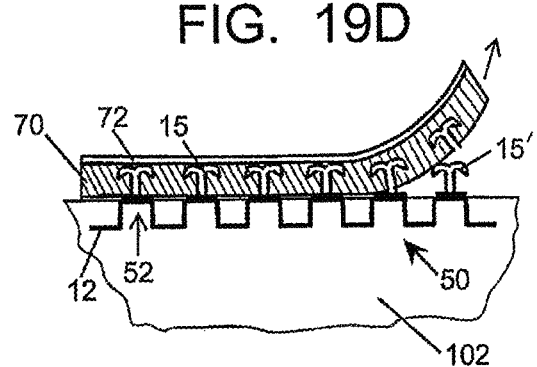

A flexible, corrugated or otherwise compliant material may be laminated to, imbedded into or otherwise provided in such a manner, below, on top of or inside the compliant material (FIG. 19C) to assist in the removal of the compliant material or to maintain the integrity of the compliant material as it is stripped from the corrugated strip. See FIG. 19D. It is anticipated that any protective cover or compliant material may contain metallic powders or other materials that may allow the compliant material to be made attractive to magnetic forces. Such material may include magnetic materials or materials that may be subsequently magnetized to make the compliant material attractive to other magnetic materials or attractable materials, such as iron, etc.

Figure 21:
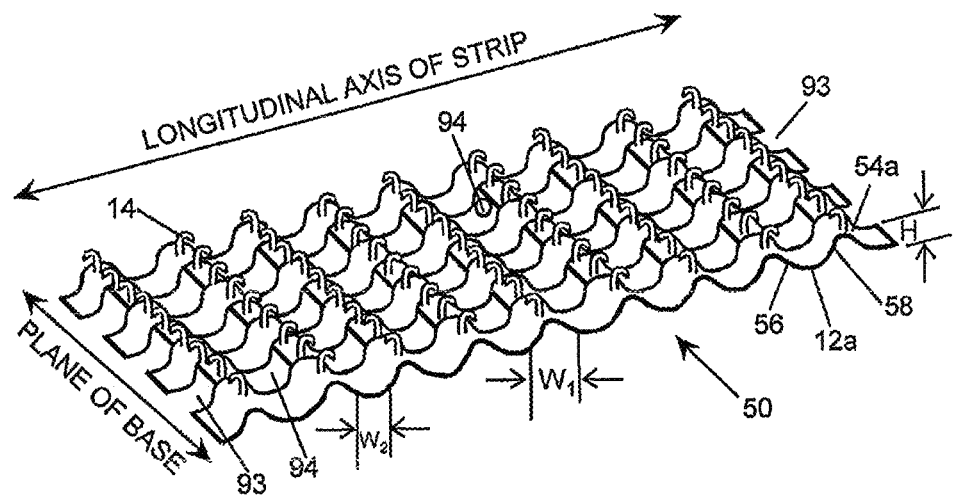
FIG. 21 is another perspective view of an exemplary corrugated touch fastening strip formed with apertures and notches on the plurality of channels, according to the present disclosure.
Figure 22A:
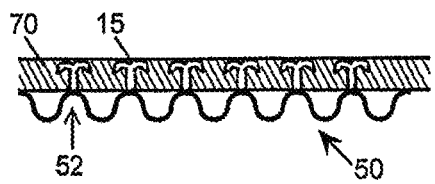
FIG. 22A-D are additional sectional views of the corrugated fastener strip, according to the present disclosure, including a protective compliant material for the fastening elements.
Figure 22B:
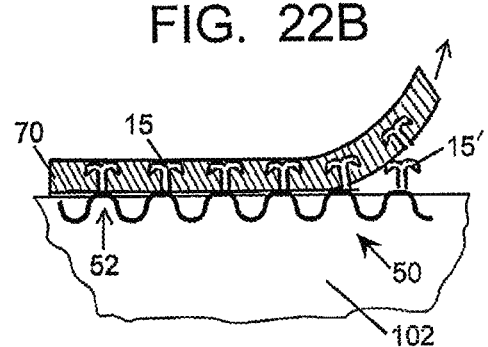
Figure 22C:
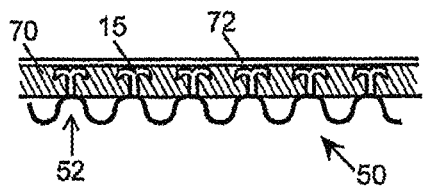
Figure 22D:
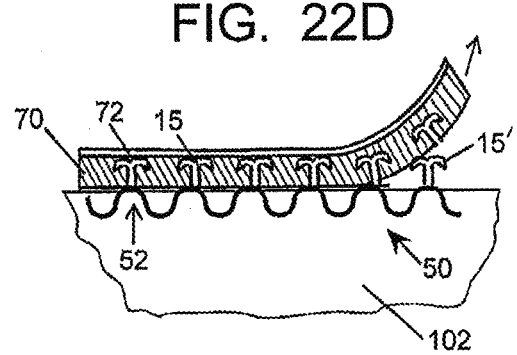

Attention is directed to FIG. 21 which is similar to FIG. 20A, with the feature that the fastening strip 50 now preferably includes curved portions 54a and 12a as between wall portions 56 and 58. Accordingly, curved portions 54a and 12a may include substantially continuous curvature. Such a fastening strip may therefore be understood to preferably have a continuous sinusoidal type geometry characterized by a sine wave which then repeats along the longitudinal axis of the fastener strip. As illustrated, such fastener may again have all of the features shown and described above in FIGS. 20A and 19A, 19B, 19C, and 19D. This includes the feature of a protective compliant material 70 that may also partially or fully encapsulate and protect the fastening elements 14 or 15. It also includes openings such as notches 93 and/or apertures 94. Furthermore, the curved top portion 54a and/or curved bottom portion 12a may have the differential thickness as compared to the side walls 56 and 58 as shown and described above in FIGS. 11A and 11B.

In addition, a pull tab, a die cut or other feature may be incorporated into or added to the compliant material to facilitate subsequent removal of the compliant material.

A film or coating or other material may be applied to the corrugated strip after forming the corrugated strip to a desired shape, for instance, curved shape so as to assist in retaining the desired shape. For example, a straight corrugated strip may be bent into a curved shape (FIGS. 8A and 8B) and a film, coating or other material may be applied to one or more surfaces to allow the strip to retain the new curved shape. Alternatively, adhesives, heat, ultrasonics, mechanical staking or other means of securing the corrugated strip in the desired shape may be employed. It should also be appreciated that the relatively flat base 12 may provide an effective bonding surface for attaching a bent corrugated strip to a substrate using adhesives, ultrasonics or other methods known to those skilled in the art.

The composition of the compliant material may be modified so as to permit the compliant material to protect the fastening elements during other types of insert-molding or laminating operations such as compression molding, injection molding, reaction injection molding, extrusion coating, casting, etc. Although the application for automotive seating is discussed in this disclosure, it is anticipated that the use of the invention herein disclosed as well as the use of various protective techniques disclosed herein may be used for other applications within as well as outside the realm of automotive seating.

Figure 14A:
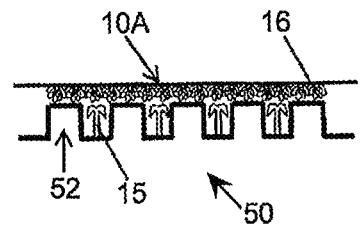
FIGS. 14A and 14B illustrate in cross-section the attachment of a loop fastener strip to a corrugated strip including hook elements, according to the present disclosure, where a force is required for engagement.
Figure 14B:
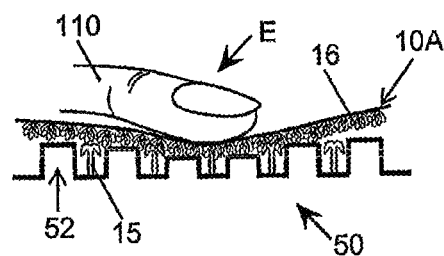

Fastening elements may be positioned within corrugations so as to partially or fully shield the fastener from premature engagement with a mating fastener product. FIG. 14A illustrates in cross-section, a corrugated fastener strip 50 with double hook style fastening elements 15 located between channels 52. FIG. 14A further illustrates a loop 16 style flat fastening strip 10A positioned adjacent to the corrugated hook-style fastener strip 50. By positioning the hook style fastening elements 15 between the channels 52, the loop style elements 16 are restricted from engaging with the hook style elements 15. The positioning of the hook style elements 15 within the corrugations also may serve to partially or fully shield the hook style fastening elements 15 from unwanted engagement or snagging on other materials that may be prone to engaging with the hook style elements. This may be beneficial for use on clothing where it is common place for portions of a garment to inadvertently snag on a hook-style fastener during laundering or during casual contact with the fastening elements. When the user desires to make an attachment or mate the corrugated fastener with a complimentary fastener, the user simply applies pressure (arrow E) to the closure, such as from a finger 110 as illustrated in FIG. 14B, thereby deforming the channels 52 locally, exposing hooking elements 15 to the mating fastener elements, loops 16, in this case. FIG. 14B illustrates a loop style flat fastener strip 10A being locally deformed and corrugations 52 being compressed to allow hooking elements 15 to engage loop elements 16. Stretching the strip will also make the fastening elements more available for engagement.

In the case of fasteners that cannot readily be produced or formed into a corrugated shape, additional materials such as adhesives, coating, films, polymers, may be added to the fastener tape during or prior to the manufacturing or forming process to enhance the retention of the corrugations in the finished product. Elastomeric material may be added to increase the resilience of the product or otherwise provide desired properties.

Figure 15A:
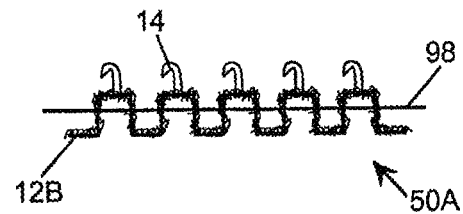
FIGS. 15A and 15B illustrate in cross-section that elastomeric fibers or films may be integrated into or onto the exemplary corrugated fastener strip of the present application.
Figure 15B:
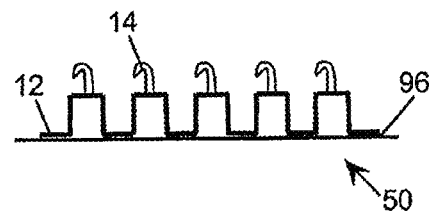

Elastomeric fibers, yarns or other elements may be added to or woven into the corrugated structure 50 to provide or enhance elastomeric properties or otherwise alter the mechanical properties of the corrugated strip. FIG. 15A illustrates a textile type corrugated fastener strip 50A wherein an elastomeric fiber 98 or strip has been woven integral with the structure 50. FIG. 15B illustrates a corrugated fastener strip 50 wherein an layer of, for instance, elastomeric film or a non-woven 96 has been attached to the bottom surface of the corrugated strip 50. Without limitation, it is contemplated that elastomeric fibers, threads, non-wovens, films, or other substrates may be used to provide elastomeric enhancement to the corrugated fastener strip 50.

Manufacturing Methods

Figure 16:
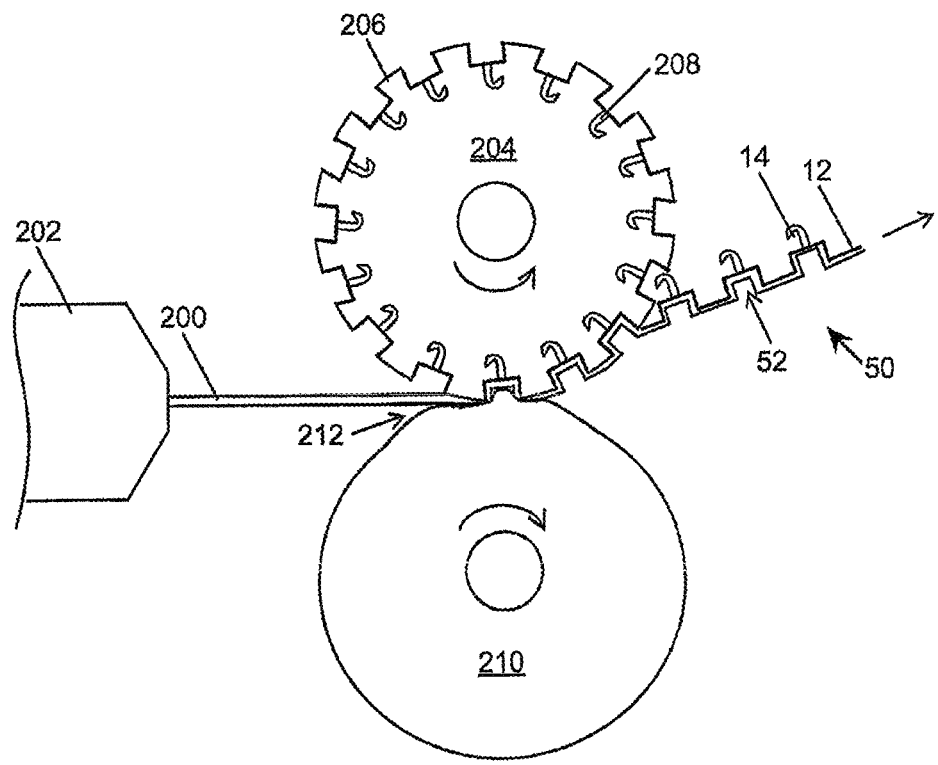
FIG. 16 is a side view of an exemplary apparatus for forming the corrugated fastener strip according to the present disclosure.

Corrugations, as described herein, may be molded into or woven into a fastener strip 50 during the manufacturing thereof or they may be formed as part of or after the production of the fastener strip. FIG. 16 illustrates one exemplary method wherein the corrugated fastener strip may be integrally formed during the molding operation for a strip including fastener elements by forcing molten polymer 200 from an extruder 202 or similar feed device into a nip 212 between a molding roll 204 having a corrugated surface 206 and fastener cavities 208 and a complimentary roll 210. In this example, the complimentary roller 210 may include a compliant outer surface 214 which may be used to force the polymer 200 into the corrugated surface 206 and fastener cavities 208 and form the base strip into channels 52 at the same time as the hooks 14, or other fastening elements, are formed. A mating roller with a complimentary corrugated outer surface, or other continuous or intermittent method of providing pressure, may also be used in lieu of the compliant roller to urge the polymer into the desired geometry and form a base 12 including channels 52 and fastening elements 14, etc. Accordingly, the application of intermittent pressure at the nip when employing a complimentary roller with the male portion to form the corrugations may allow for relatively deeper draw and relatively more precise geometries. The molding roll and the complimentary roll may have corrugations in the machine direction, cross-machine direction or at any angle of combination of angles, such as herringbone patterns, etc. The molding roll and/or the complimentary roll may be constructed using a series of stacked rings or plates as disclosed in U.S. Pat. Nos. 3,312,583; 4,775,310 or 3,752,619, etc. Fastener cavities may be partially or fully cut through the laminated plates and may be formed using conventional machining, EDM (electrical discharge machining), chemical etching, laser, electroforming, etc.

Various other methods may be used as well to mold the channels integral with the fastener strip. Co-extrusions or various web-like materials or film-like materials or elastomeric materials may be introduced during or prior to the above molding operation as well. Thermoplastic, plastisols, thermo-set as well as cross-linkable materials and other materials used in the production of touch fasteners are contemplated. The corrugated topology and/or the fastening element may be formed with or without the use of heat and may be formed using any of the mechanical or chemical means currently available or known to those skilled in the art.

As may be appreciated with reference to FIG. 16, the corrugated fastener as formed herein, with the formation of plane-like side walls 56 and 58 due to stretching, will lead to an increase in the degree of polymer orientation in such walls 56 and 58 as the walls are formed. This then results in an increase in the overall tensile strength of the fastener, and in particular, at the side wall locations. This increase in strength when the fastener herein is employed in molded-in applications, such as in automotive seating or other insert-molding operations, provides an increase in the anchoring strength of the fastener to the selected substrate.

Figure 17:
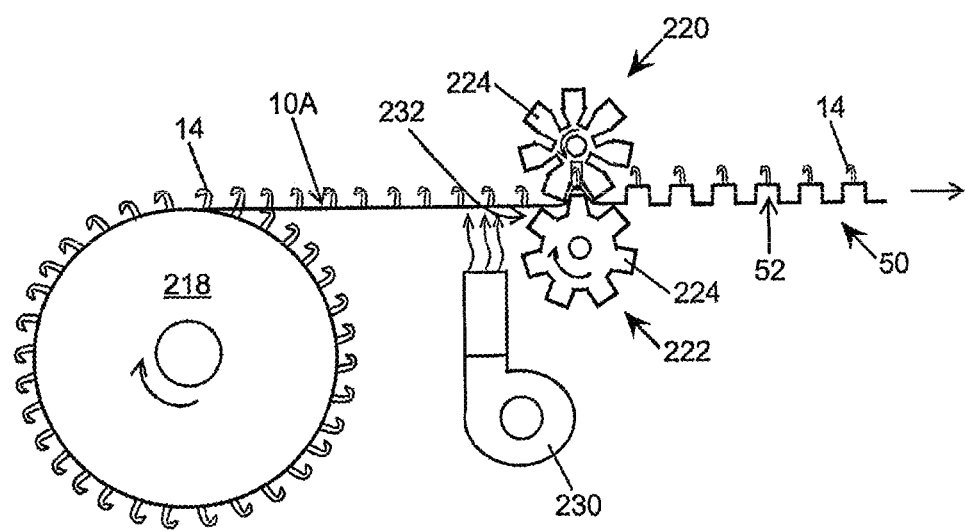
FIG. 17 is a side view of another exemplary apparatus for forming the corrugated fastener strip according to the present disclosure.

A corrugated fastener strip 50 including channels 52 may be formed by passing an already formed flat fastener strip 10 from a feed roll 218 through a set of complimentary "gear-like" rollers 220, 222 as illustrated in FIG. 17. The projecting teeth 224 on the rollers 220, 222 deform the strip 10 and form the channels 52 in the strip 50. The fastening strip 10A, and/or the rollers 220, 222 may be heated (at 230, for instance) if desired to facilitate the formation of corrugations. Additional materials, such as films, fibers, foils, adhesives, polymers, etc. may be introduced into the nip area 232 of the "gear-like" rollers 220, 222 during formation if desired. In some cases a metallic strip may be introduced and may be bonded to the fastener strip during the corrugation process. The attachment of a metallic strip to the corrugated fastener may permit the corrugated fastener to be bent into a desirable shape and retain that shape. The metallic strip may also serve to allow the corrugated fastener strip to be made magnetically attractive. This may be beneficial for applications such as automotive seating wherein it is common practice to temporarily affix the fastening strip in a seat cushion mold using magnets preinstalled in the mold surface.

Figure 18A:
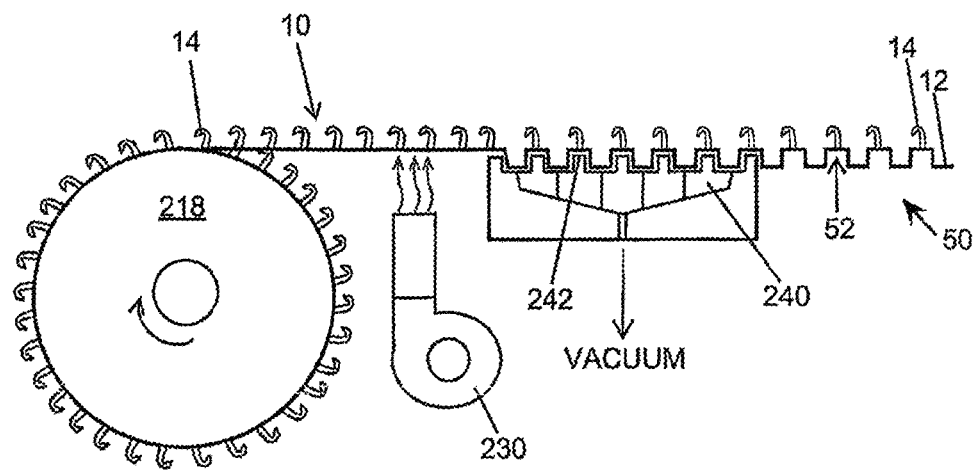
FIG. 18A is a side view of another exemplary apparatus for forming the corrugated fastener strip according to the present disclosure.
Figure 18B:
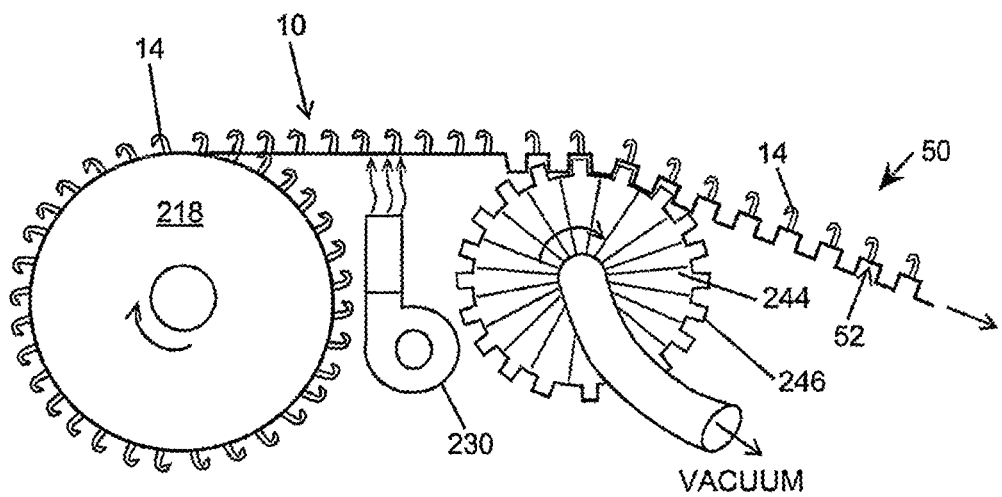
FIG. 18B is a side view of an exemplary apparatus for forming the corrugated fastener strip according to the present disclosure.

Corrugated fastener strips 50 may be formed by thermoforming (or vacuum forming) channels 52 into a flat fastener strip 10A. FIG. 18A illustrates an example of an intermittent method for forming channels 52 and FIG. 18B illustrates an exemplary continuous method for forming channels in a flat strip 10A. In FIG. 18A, a flat fastener strip 10A may be supplied from a feed roll 218 and into a foraminous mold 240 having a corrugated surface 242 where a vacuum (and/or pressure) may be applied to the strip to force the strip to conform to the corrugated surface of the mold and form channels 52 in the strip. The result is a corrugated fastener strip 50 including fastener elements 14, for example. The fastener strip 10A may be heated prior to forming (230) or during forming in the corrugated mold, and assisted by vacuum or a pressure differential or other method know to those skilled in the art.

In FIG. 18B, a continuous method of forming is illustrated, wherein a flat fastener strip 10A may be supplied from a feed roll 218 and over a roller 244 having a corrugated outer surface 246 and including means for drawing a vacuum over the roller 244 (porous, foraminous, etc.). The vacuum (or pressure) may be applied to the strip to force the strip to conform to the corrugated surface of the mold and form channels 52 in the strip. The result is a corrugated fastener strip 50 including fastener elements 14, for example. The fastener strip 10A may be heated (230) prior to forming or during forming in the corrugated mold.

This disclosure further contemplates and includes the use of commonly owned U.S. application Ser. No. 12/690,700 filed Jan. 20, 2010, the teachings of which are included herein in their entirety and which application is attached hereto.

In all embodiments described above as well as other configurations contemplated by this disclosure, it is contemplated that the fastener strip 50 may have areas that are corrugated with or without fastening elements. It is further contemplated that all or only a portion of the fastener strip may be corrugated, that corrugations may be uniform or non-uniform in nature, that the fastener strip may be straight or curved or any combination of such, that the fastener strip may retain a shape when deformed or may be somewhat resilient and may return to a preferred shape after temporary deformation.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A touch fastening strip comprising:
   a corrugated strip defining an undulating surface and forming a plurality of channels and a base portion between adjacent channels, the corrugated strip defining a plane, the corrugated strip constructed and arranged to be bendable within the plane and out of the plane, and such that when the corrugated strip bends within the plane, the corrugated strip remains in the plane;
   fastening elements formed on and projecting from at least portions of a top of the undulating surface that define a fastening location; and
   a protective material configured to prevent contamination of the fastening elements during a molding process, wherein the corrugated strip is embedded in an object comprising foam.

2. The touch fastening strip of claim 1, wherein the protective material comprises a gasket.

3. The touch fastening strip of claim 1, wherein the corrugated strip is embedded in the object in a bent configuration.

4. The touch fastening strip of claim 3, further comprising a mating fastener secured to the corrugated strip.

5. The touch fastening strip of claim 4, wherein the mating fastener secures a cover to the object.

6. The touch fastening strip of claim 5, wherein the object is a seat cushion.

7. The touch fastening strip of claim 1, wherein the protective material is configured to be removed from the corrugated strip.

8. The touch fastening strip of claim 1, wherein the protective material comprises a protective cover applied to the fastening elements.

9. A touch fastening strip comprising:
   a corrugated strip defining an undulating surface and forming a plurality of channels and a base portion between adjacent channels, the corrugated strip defining a plane, the corrugated strip constructed and arranged to be bendable within the plane and out of the plane, and such that when the corrugated strip bends within the plane, the corrugated strip remains in the plane;
   fastening elements formed on and projecting from at least portions of a top of the undulating surface that define a fastening location; and
   a protective material configured to prevent contamination of the fastening elements during a molding process, wherein the corrugated strip includes one or more openings in the channels.

10. The touch fastening strip of claim 9, wherein the protective material comprises a gasket.

11. The touch fastening strip of claim 9, wherein the corrugated strip is embedded in an object comprising foam.

12. The touch fastening strip of claim 11, wherein the corrugated strip is embedded in the object in a bent configuration.

13. The touch fastening strip of claim 12, further comprising a mating fastener secured to the corrugated strip.

14. The touch fastening strip of claim 13, wherein the mating fastener secures a cover to the object.

15. The touch fastening strip of claim 14, wherein the object is a seat cushion.

16. The touch fastening strip of claim 9, wherein the protective material is configured to be removed from the corrugated strip.

17. The touch fastening strip of claim 9, wherein the protective material comprises a protective cover applied to the fastening elements.

\* \* \* \* \*